(12) United States Patent
Zhao et al.

(10) Patent No.: US 11,557,083 B2
(45) Date of Patent: Jan. 17, 2023

(54) PHOTOGRAPHY-BASED 3D MODELING SYSTEM AND METHOD, AND AUTOMATIC 3D MODELING APPARATUS AND METHOD

(71) Applicant: Shanghai Yiwo Information Technology Co., LTD., Shanghai (CN)

(72) Inventors: Ming Zhao, Shanghai (CN); Zhongzheng Xiang, Shanghai (CN); Pei Cai, Shanghai (CN)

(73) Assignee: Shanghai Yiwo Information Technology Co., LTD., Shanghai (CN)

( * ) Notice: Subject to any disclaimer, the term of this patent is extended or adjusted under 35 U.S.C. 154(b) by 84 days.

(21) Appl. No.: 16/998,953

(22) Filed: Aug. 20, 2020

(65) Prior Publication Data

US 2021/0056751 A1    Feb. 25, 2021

Related U.S. Application Data

(63) Continuation of application No. PCT/CN2020/090469, filed on May 15, 2020.

(30) Foreign Application Priority Data

Aug. 23, 2019 (CN) .......................... 201910784772.1
Dec. 11, 2019 (CN) .......................... 201911268632.5

(51) Int. Cl.
*G06T 17/00* (2006.01)
*G06K 9/62* (2022.01)
(Continued)

(52) U.S. Cl.
CPC ............ *G06T 17/00* (2013.01); *G06K 9/6201* (2013.01); *G06T 7/593* (2017.01); *G06T 7/74* (2017.01);
(Continued)

(58) Field of Classification Search
CPC ....... G06T 11/203; G06T 17/00; G06T 19/20; G06T 2207/20021; G06T 2207/20081;
(Continued)

(56) References Cited

U.S. PATENT DOCUMENTS

| 2013/0135295 A1* | 5/2013 | Li | G06F 3/04883 |
| | | | 345/419 |
| 2013/0329014 A1* | 12/2013 | Obata | H04N 13/366 |
| | | | 348/51 |
| 2019/0139179 A1* | 5/2019 | Wang | G06N 3/088 |

FOREIGN PATENT DOCUMENTS

| CN | 102375831 A | 3/2012 |
| CN | 103729883 A | 4/2014 |

(Continued)

OTHER PUBLICATIONS

Foley et al., Computer Graphics Principles and Practices, 2nd edition, Addison-Wesley Publishing Company, 1996, section 6.4, p. 253-258 (Year: 1996).*

(Continued)

*Primary Examiner* — Sing-Wai Wu
(74) *Attorney, Agent, or Firm* — Seed IP Law Group LLP

(57) ABSTRACT

The present disclosure discloses a photography-based 3D modeling system and method, and an automatic 3D modeling apparatus and method, including: (S1) attaching a mobile device and a camera to the same camera stand; (S2) obtaining multiple images used for positioning from the camera or the mobile device during movement of the stand, and obtaining a position and a direction of each photo capture point, to build a tracking map that uses a global coordinate system; (S3) generating 3D models on the mobile device or a remote server based on an image used for 3D modeling at each photo capture point; and (S4) placing the individual 3D models of all photo capture points in the global three-dimensional coordinate system based on the (Continued)

position and the direction obtained in S2, and connecting the individual 3D models of multiple photo capture points to generate an overall 3D model that includes multiple photo capture points.

30 Claims, 5 Drawing Sheets

(51) Int. Cl.
| | |
|---|---|
| *G06T 7/593* | (2017.01) |
| *G06T 7/73* | (2017.01) |
| *G06T 11/20* | (2006.01) |
| *G06T 19/20* | (2011.01) |
| *G06V 20/00* | (2022.01) |
| *H04N 5/225* | (2006.01) |
| *H04N 5/232* | (2006.01) |
| *G06V 10/44* | (2022.01) |

(52) U.S. Cl.
CPC ............ *G06T 11/203* (2013.01); *G06T 19/20* (2013.01); *G06V 10/44* (2022.01); *G06V 20/36* (2022.01); *H04N 5/2253* (2013.01); *H04N 5/232935* (2018.08); *G06T 2207/20021* (2013.01); *G06T 2207/20081* (2013.01); *G06T 2207/30204* (2013.01); *G06T 2207/30244* (2013.01); *G06T 2219/008* (2013.01); *G06T 2219/2004* (2013.01)

(58) Field of Classification Search
CPC . G06T 2207/30204; G06T 2207/30244; G06T 2210/04; G06T 2219/008; G06T 2219/2004; G06T 7/55; G06T 7/593; G06T 7/74; G06K 9/00208; G06K 9/00691; G06K 9/3233; G06K 9/4604; G06K 9/6201; H04N 5/2251; H04N 5/2253; H04N 5/23238; H04N 5/232935
See application file for complete search history.

(56) References Cited

FOREIGN PATENT DOCUMENTS

| | | | | |
|---|---|---|---|---|
| CN | 105787996 A | | 7/2016 | |
| CN | 108961395 A | * | 12/2018 | ............. G06T 17/00 |

OTHER PUBLICATIONS

EPO translation of CN103729883 (Year: 2014).*
EPO translation of CN105787996 (Year: 2016).*
EPO translation of CN108961395 (Year: 2018).*

* cited by examiner

PHOTOGRAPHY-BASED 3D MODELING SYSTEM AND METHOD, AND AUTOMATIC 3D MODELING APPARATUS AND METHOD

BACKGROUND

Technical Field

The present disclosure relates to a 3D modeling system and method, and in particular to a photography-based 3D modeling system and method, and an automatic 3D modeling apparatus and method.

Description of the Related Art

To solve a technical problem, the present disclosure provides a photography-based three-dimensional space modeling solution, which can be used for single-space or multi-space 3D modeling and/or 2D floorplan generation.

There are mainly two conventional photography-based 3D modeling methods, both of which have obvious disadvantages.

In method (a), a camera that can record depth information is used to directly generate a 3D model. Such a method relies on complex hardware, resulting in high equipment costs, and usually operated by professional photographers. As a result, this method has disadvantages for wide adoption.

In method (b), two photos are captured respectively at two photo capture points that are close to each other. Preferably, the photo capture points are separated at the centimeter level or decimeter level, and feature point matching is performed and photo capture points are positioned successively. Then, Multi View Stereo (MVS) (for details, refer to https://github.com/cdcseacave/openMVS) is used for modeling. The advantage is that the entire process is fully automatic without manual intervention. However, the disadvantages are obvious.

Disadvantage 1: It is computation intensive, and as a result rapid modeling cannot be easily achieved on devices with limited computing resources, such as mobile devices. Photos usually need to be uploaded to the server (cloud/PC), to run modeling algorithms benefiting from stronger computing capacities.

Disadvantage 2: It is difficult to specify how far photo capture points should be apart from each other. If the photo capture points are too dense, operations become inconvenient and time-consuming. If photo capture points are selected simply based on unobstructed line of sight between two adjacent photo capture points or by "feeling right", modeling may fail, and no warning can be provided for users during photo capture.

In addition, methods for reconstructing three-dimensional space scenes based on photography have been provided in the past. However, in most of these methods, 3D models cannot be automatically generated from the images used for 3D modeling, and tedious manual intervention is required to correct the 3D model of each space. In addition, the 3D models of multiple spaces cannot be automatically assembled, therefore need to be manually edited by finding matching features through human observation, which is time-consuming and labor-intensive.

BRIEF SUMMARY

To overcome one or more of the above disadvantages of the conventional methods, the present disclosure uses innovative methods, namely, deep learning and image processing methods, to perform modeling for a single photo capture point. The modeling can be performed on a mobile device with a limited computing capability, or related data can be uploaded to a cloud server for modeling. In addition, in the case of rapid modeling by using the mobile device, to improve timeliness, only a room outline is modeled, and models of objects such as furniture and decorations are not restored. A photo capture point positioning system is built to place individual models of multiple photo capture points in the global coordinate system according to their positions and directions. Individual models of multiple photo capture points are optimized and properly connected, to generate an overall 3D model and an overall 2D floorplan.

The present disclosure supports a wide range of photo capture methods with low costs, including but not limited to a fisheye lens of a mobile phone, a panoramic camera, a camera with a fisheye lens, an ordinary mobile phone, an ordinary digital camera, etc.

Ordinary photo, a photo captured by using ordinary digital cameras (including an ordinary single-lens reflex (SLR) camera, a mirrorless camera, a point&shoot camera, etc.), a panoramic camera, a camera with a fisheye lens, an ordinary mobile phone, a mobile phone with a fisheye lens, and a video camera. Unlike binocular vision, for ordinary photos, three-dimensional information cannot be restored from two photos captured at the same photo capture point. Ordinary photos are hereinafter referred to as photos.

When using a panoramic camera, panoramic images are usually captured. Some computer vision and image processing algorithms, such as line detection, requires converting a panoramic image into an undistorted image. The expressions of photos and pictures used below include panoramic photos and converted undistorted images.

The present disclosure provides a photography-based 3D modeling system and method, and an automatic 3D modeling apparatus and method, to support multiple photo capture devices, and automatically assemble 3D models of various photo capture points based on an relative position of each photo capture point and capture direction information of a camera lens that are obtained during photo capture, to generate an overall 3D model. In the present disclosure, a 2D floorplan can also be generated.

Specifically, the present disclosure provides a photography-based 3D modeling system, including: a photo capture unit, configured to capture a first image of each of multiple spaces; a 3D model generation unit, configured to generate a 3D model of each space based on the first image that is captured by the photo capture unit for each space; a capture position acquisition unit, configured to obtain position and capture direction information of the photo capture unit when capturing the first image of each space; and a 3D model assembling unit, configured to: based on the position and capture direction information, assemble the 3D models of the individual spaces in the global three-dimensional coordinate system to generate an overall 3D model that includes the individual spaces.

Further, the photo capture unit captures multiple second images when moving among the spaces; the capture position acquisition unit performs feature point matching based on the multiple second images to obtain relative displacement and/or capture direction information of each photo capture point, for example, build a tracking map that includes all photo capture points in the global coordinate system, so as to obtain position and/or capture direction information of the photo capture unit when capturing the first image of the space in which the photo capture unit is located.

Further, the photo capture unit has one or more positioning-aware sensors and/or one or more direction-aware sensors; and the capture position acquisition unit obtains, based on positioning information and/or direction information provided by the photo capture unit when capturing a first image of a space in which the photo capture unit is located, position and/or capture direction information of the photo capture unit when capturing the first image of the space in which the photo capture unit is located.

Further, the photo capture unit captures multiple second images when moving among the spaces; the photo capture unit has one or more positioning-aware sensors and/or one or more direction-aware sensors; and the capture position acquisition unit performs feature point matching based on images at adjacent photo capture points among the multiple second images captured by the photo capture unit, to obtain relative displacement and capture direction information of each photo capture point, for example, by building a tracking map that includes all photo capture points in the global coordinate system, and correcting the tracking map based on positioning information and/or direction information provided by the photo capture unit when capturing a first image of a space in which the photo capture unit is located, so as to obtain position and/or capture direction information of the photo capture unit when capturing the first image of the space in which the photo capture unit is located.

Further, the capture position acquisition unit corrects the relative displacement (from which the tracking map is generated) and/or capture direction information based on displacement information such as acceleration information and velocity information provided by one or more displacement-aware sensors (which may include, for example, an acceleration sensor and a velocity sensor) of the photo capture unit.

Further, the 3D model assembling unit converts local coordinates of the 3D model of each individual room into global coordinates, for example, by using a transformation matrix based on the position and capture direction information obtained by the capture position acquisition unit when each room is captured, so as to obtain the overall 3D model of all photo capture points.

Further, the method for converting local coordinates of the 3D model of a single room into global coordinates includes: enabling the photo capture unit to move a predetermined distance, and obtaining, by the capture position acquisition unit, coordinates of two endpoints of the predetermined distance, where a ratio of the difference between the coordinates of the two endpoints to the predetermined distance is the scale of the local coordinates to the global coordinates; or estimating, by using one or more feature points identified by the capture position acquisition unit, a ratio of the height of the plane of the floor or ceiling of the space to the actual height of the photo capture unit, to obtain the scale of the local coordinates to the global coordinates.

Further, before performing photo capture at a first photo capture point or during movement of subsequent photo capture, the photo capture unit moves a predetermined distance to obtain a predetermined quantity of the feature points.

Further, the photo capture unit has binocular lenses, and the binocular lenses separately capture the first image at the same photo capture point; and the 3D model generation unit compares the first images that are captured by the binocular lenses, determines corresponding pixels, and obtains depth information of each corresponding pixel, so as to generate the 3D model.

Further, the 3D model generation unit predicts a depth of each pixel in the first image by using a deep learning method, and calculates a normal direction of each pixel or predicts the normal direction of each pixel by directly using the deep learning method, so as to generate a 3D model of each space.

Further, the photo capture unit is implemented by a camera and/or a mobile device such as a mobile phone with a photo capture function; the 3D model generation unit is implemented by the mobile phone or by a remote server; when being implemented by the remote server, the 3D model generation unit receives, through a network, one or more first images that are captured and sent by the camera and/or the mobile phone with a photo capture function, to generate a 3D model of each space; the capture position acquisition unit is implemented by the camera or the mobile phone; and the 3D model assembling unit is implemented by the mobile phone or by a remote server; when being implemented by the remote server, the 3D model assembling unit receives, through a network, the position and capture direction information of each space sent by the capture position acquisition unit, completes the assembling processing based on the position and capture direction information, and sends the generated overall 3D model to the mobile phone or another device.

Further, the camera and the mobile phone with a photo capture function for implementing the photo capture unit are attached to the same camera stand; and during movement of the stand, multiple second images captured by the camera or the mobile phone with a photo capture function are obtained, so as to obtain position and capture direction information of the camera or the mobile phone with a photo capture function when capturing the first image of the space in which the camera or the mobile phone is located.

Further, based on a positioning system of the camera or the mobile phone with a photo capture function, the second images captured by the camera or the mobile phone with a photo capture function are used, and feature point matching is performed based on second images at adjacent photo capture points to obtain relative displacement and capture direction information of each photo capture point, thereby providing a relative position and direction of each photo capture point.

Further, before capturing the first image of the first space or during movement of subsequent photo capture, the photo capture unit obtains an angle between the capture direction of a lens of the camera and the capture direction of the mobile phone by using one or more of the following methods:

herein, the capture direction of the lens of the camera may be a direction of one of two fisheye lenses (front and rear) of a common panoramic camera, or may be a direction of a lens for capturing the first photo by a panoramic camera that captures multiple photos needed for one complete panoramic image by rotating one lens;

(1) simultaneously running a positioning system based on the mobile phone and a positioning system based on the camera, and moving the stand by a specific distance; in such case, the two systems each provide one displacement vector, and an angle between the two vectors is the angle between the capture direction of the lens of the camera and the capture direction of the mobile phone;

(2) specifying an angle consistent with the capture direction of the mobile phone by manually rotating a preview image or a captured image of the camera;

(3) matching preview images or captured images of the mobile phone and the camera by using an image recognition algorithm, to identify the angle;

(4) using an additional mark (including adding a mark to the stand which is at a known fixed angle with a mounting direction of the mobile phone), and then identifying the mark in the preview image or the image of the camera, so as to calculate the angle between the capture direction of the lens of the camera and the capture direction of the mobile phone; and (5) using a camera installation interface on the stand so that a known fixed angle is formed between the camera and the mobile phone (mobile device).

Further, the space is a room; the first image is an indoor image of the room; and the 3D model generation unit identifies one or more image areas of at least one of a floor, a ceiling, and a wall in the first image based on a deep learning method; divides the identified image area(s) into blocks based on an image processing technology, where each block is approximately considered as one plane, image blocks of the floor and the ceiling are located on a horizontal plane, and an image block of the wall is located on a vertical plane; and generates the 3D model by solving an equation for each plane, where for two planes that intersect in the first image, an error between a calculated intersecting line and an actually observed intersecting line is minimized.

Further, the 3D model generation unit uses a computer vision algorithm to identify wall corners in the indoor image and connect the wall corners to generate a rough model of the room.

Further, the 3D model assembling unit performs a correction on the 3D models of the multiple rooms, including correcting wall line directions of all rooms by using a statistical method, so that wall lines of all rooms are aligned in the same direction if they were parallel within an error range; and when assembling the 3D models of the rooms, the 3D model assembling unit corrects one or more overlapping parts and/or gaps.

Further, the photography-based 3D modeling system according to the present disclosure further includes a 2D floorplan generation unit, configured to generate a 2D floorplan in the following ways: projecting each surface of the generated 3D model onto a plane parallel to the floor, and merging these projections into a polygon; correcting and simplifying the obtained polygon, including at least one of the following methods: (1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions; assembling the generated 2D floorplans of the rooms in the same two-dimensional coordinate system based on the position and capture direction information of each space obtained by the capture position acquisition unit, to generate an overall 2D floorplan from the individual 2D floorplans of the rooms; and identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

Further, the 2D floorplan generation unit performs a correction on the 2D floorplans of the multiple rooms, including correcting wall line directions of all rooms by using a statistical method, so that wall lines of all rooms are aligned in the same direction if they were parallel within a specific error range; and when assembling the 2D floorplans of the rooms, the 2D floorplan generation unit corrects one or more overlapping parts and/or gaps.

Further, the photography-based 3D modeling system according to the present disclosure can also include a 2D floorplan generation unit, configured to generate a 2D floorplan in the following ways: projecting each surface of the overall 3D model generated by the 3D model assembling unit onto a plane parallel to the floor, and merging these projections into one or more polygons; correcting and simplifying the obtained polygon(s), including at least one of the following methods: (1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions; and identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

In addition, the present disclosure further provides an automatic 3D modeling apparatus, including: a 3D model generation unit, configured to: based on a first image of each of multiple spaces included in a modeling object, generate a 3D model of each space; and a 3D model assembling unit, configured to: based on position and capture direction information when the first image of each of the multiple spaces is captured, assemble the 3D models of the spaces generated by the 3D model generation unit in the global three-dimensional coordinate system, to generate an overall 3D model from the individual 3D models of the spaces.

In addition, the present disclosure further provides an automatic 3D modeling method, including: a 3D model generation step: based on a first image of each of multiple spaces included in a modeling object, generating a 3D model of each space; and a 3D model assembling step: based on position and capture direction information when the first image of each of the multiple spaces is captured, assembling the 3D models of the spaces generated in the 3D model generation step in the global three-dimensional coordinate system, to generate an overall 3D model from the individual 3D models of the spaces.

In addition, the present disclosure further provides a photography-based 3D modeling method, including the following steps: (S1) attaching a mobile device with a photo capture function and a camera onto the same camera stand; (S2) obtaining multiple second images from the camera or the mobile device during movement of the stand, and obtaining a position and a capture direction of each photo capture point by optionally using one or more sensors of the camera or the mobile device, to build a tracking map that uses a global coordinate system; (S3) generating 3D models on the mobile device or a remote server based on a first image captured at each photo capture point; and (S4) placing the individual 3D models of all photo capture points in the global three-dimensional coordinate system based on the position and the capture direction obtained in S2, and connecting the individual 3D models of multiple photo capture points to generate an overall 3D model that includes multiple photo capture points.

Further, step S2 uses a positioning system of the mobile device or the camera and performs feature point matching based on second images captured by the mobile device or the camera at adjacent photo capture points, to identify relative displacement and capture direction information of the photo capture points, in order to build a tracking map that includes all photo capture points in the same coordinate system and provides a position and a direction of each photo capture point.

Further, step S2 further includes correcting the tracking map from obtaining information that includes acceleration, velocity, and direction of movement by using one or more sensors of the mobile device or the camera.

Further, step S2 further includes obtaining an angle between a capture direction of a lens of the camera and a capture direction of the mobile device, where at an initialization stage, the positioning system based on the mobile device and the positioning system based on the camera run simultaneously, and the camera stand is moved by a specific distance; in such case, the two systems each provide one displacement vector, and an angle between the two vectors is the angle between the capture direction of the lens of the camera and the capture direction of the mobile device; an angle consistent with the capture direction of the mobile device is specified by manually rotating a preview image or a captured image of the camera; preview images or captured images of the mobile device and the camera are matched by using an image recognition algorithm, to identify the angle; or an additional mark is used (including adding a mark to the stand to form a known fixed angle with a mounting direction of the mobile device), and then the mark is identified in the preview image or the image of the camera, so as to calculate the angle between the capture direction of the lens of the camera and the capture direction of the mobile device.

Further, step S3 includes: (S31) identifying one or more image areas of at least one of a floor, a ceiling, and a wall in the image based on a deep learning method; and (S32) dividing the identified image area(s) into blocks based on an image processing technology, where each block is approximately considered as one plane, image blocks of the floor and the ceiling are located on a horizontal plane, and an image block of the wall is located on a vertical plane; and generating the 3D model by solving an equation for each plane, where for two planes that intersect in the image, an intersecting line of the two planes is used as a constraint, so that an error between a calculated intersecting line and an actually observed intersecting line is minimized.

Further, step S3 further includes: using a computer vision algorithm to identify wall corners in an indoor image, and connecting the wall corners to generate a rough model of a room.

Further, step S4 includes: (S41) converting local coordinates of a 3D model of a single photo capture point into global coordinates, for example, by using a transformation matrix based on the position and the capture direction of each photo capture point, so as to obtain an overall 3D model of all photo capture points; (S42) performs a correction on the 3D models of multiple photo capture points, including correcting wall line directions of all photo capture points by using a statistical method, so that wall lines of all rooms are aligned in the same direction if they were parallel within a specific error range; and (S43) when assembling the 3D models of the photo capture points, correcting one or more overlapping parts and/or gaps.

In comparison with existing technologies, the present disclosure can achieve one or more of the following beneficial effects: multiple photo capture devices are supported; tasks such as 3D modeling and assembling can be executed on both a device with limited computing capability, such as a mobile device, and a remote server; 3D models of various photo capture points can be automatically assembled based on an obtained relative position of each photo capture point and obtained capture direction information of a camera lens, to generate an overall 3D model; and a 2D floorplan can also be generated as needed. The present disclosure achieves high success rate for 3D model generation; needs as few as only one panoramic image for each room, is highly efficient with good user experience; achieves high modeling efficiency by supporting both rapid modeling during photo capture and accurate modeling on a remote server; provides a WYSIWYG (what you see is what you get) experience, as a result a user can select a new photo capture point by referring to a result of rapid modeling, so as to prevent any missed photo captures; and avoids interference from objects such as furniture, helping generate accurate floorplans.

Figure 1:
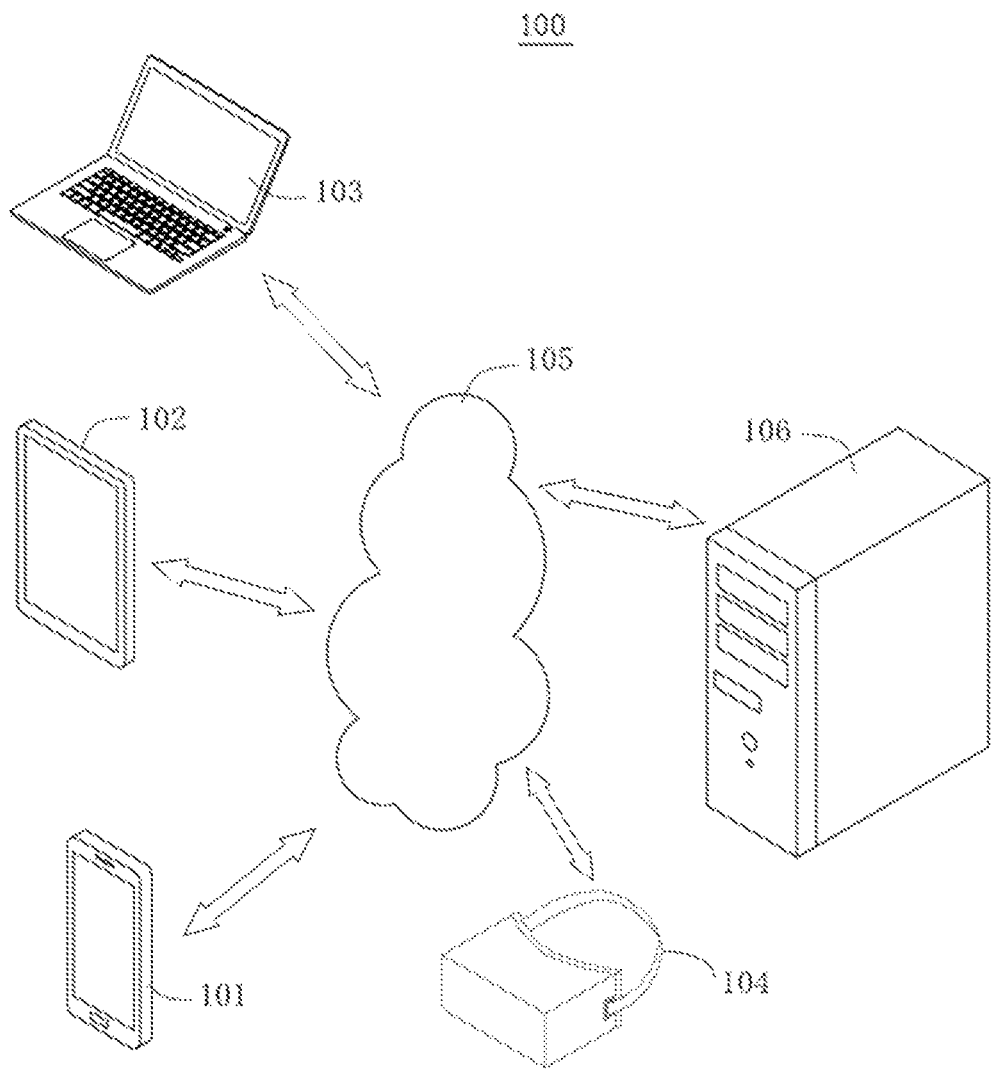
FIG. 1 is an architectural diagram illustrating an example system to which the present disclosure can be applied.

With reference to the accompanying drawings and specific implementations, the above and other features, advantages and aspects of implementations of the present disclosure become clearer. Same or similar reference numerals in the accompanying drawings represent same or similar elements. It should be understood that the accompanying drawings are examples, components and elements are not necessarily drawn to scale.

DETAILED DESCRIPTION

Unless otherwise defined, the technical and scientific terms used in this specification have the same meanings as those commonly understood by a person skilled in the art of the present disclosure. The terms used in the specification of the present application are merely intended for the purpose of describing the specific implementations, but not intended to limit the present disclosure. The terms "include" and "have" and any other variants thereof in the specification, the claims, and the accompanying drawings of the present disclosure are intended to cover non-exclusive inclusion. In the specification and the claims, or the accompanying drawings of the present disclosure, the terms "first", "second", and the like are intended to distinguish between different objects but do not indicate a particular order.

Mentioning an "implementation" in the specification means that a particular characteristic, structure, or feature described with reference to the implementation can be included in at least one implementation of the present disclosure. The word appearing in various locations in the specification does not necessarily refer to the same implementation, and is not an independent or alternate implementation exclusive of other implementations. It is explicitly and implicitly understood by a person skilled in the art that the implementations described in the specification can be combined with another implementation.

To make a person skilled in the art understand the solutions in the present disclosure better, the following further describes the present disclosure with reference to the accompanying drawings and the implementations.

System Structure

A system structure in an implementation of the present disclosure is first described. As shown in FIG. 1, a system structure 100 can include mobile devices 101, 102, 103, and 104, a network 105, and a server 106. The terminal devices 101, 102, 103, and 104 and the server 106 are connected to one another via the network 105.

In the present implementation, the mobile device 101, 102, 103, or 104 shown in FIG. 1 can transmit various information through the network 105. The network 105 can include various connection types, such as wired and wireless communication links, or fiber optic cables. It should be noted that, the above wireless connection methods can include but are not limited to a 3G/4G/5G connection, a Wi-Fi connection, a Bluetooth connection, a WiMAX connection, a Zigbee connection, a UWB connection, a local area network ("LAN"), a wide area network ("WAN"), an internetwork (for example, the Internet), an end-to-end network (for example, ad hoc end-to-end network), and other network connection methods that are currently known or will be developed in the future. The network 105 can communicate using any network protocol that is currently known or will be developed in the future, such as the Hyper Text Transfer Protocol (HTTP), and can interconnect with digital and data communication, for example, a communications network, of any form or medium.

A user can use the mobile devices 101, 102, 103, and 104 to interact with the server 106 via the network 105, to receive or send messages, etc. Various client applications can be installed on the mobile device 101, 102, 103, or 104, such as live video and playback applications, web browser applications, shopping applications, search applications, instant messaging tools, email clients, social platforms software, etc.

The mobile device 101, 102, 103, or 104 may be any electronic device that has a touchscreen and/or supports web browsing, and has a photo capture function, including but not limited to mobile terminals such as a smartphone, a tablet computer, an e-book reader, a moving picture experts group audio layer-3 (MP3) player, a moving picture experts group audio layer-4 (MP4) player, a head-mounted display device, a notebook computer, a digital broadcast receiver, a personal digital assistant (PDA), a portable multimedia player (PMP) and an in-vehicle terminal, as well as a digital TV, a desktop computer, etc.

The server 106 may be a server that provides various services, such as a back-end server that supports 3D modeling on the mobile device 101, 102, 103, or 104.

It should be understood that the quantities of mobile devices, networks, and servers in FIG. 1 are merely examples. Depending on implementation needs, there can be any quantities of mobile devices, networks, and servers.

Herein, the mobile device can be attached to a stand, such as a tripod. independently or jointly with another electronic terminal device such as a camera, to cooperate with applications running in the Android system to implement the implementation method in the present disclosure, or to cooperate with applications running in other operating systems such as the iOS system, the Windows system, and HarmonyOS to implement the implementation method in the present disclosure.

Photography-Based 3D Modeling System

Figure 2:
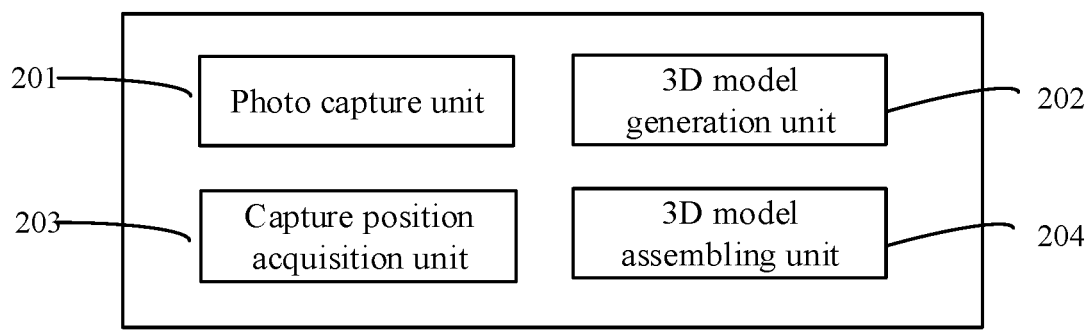
FIG. 2 is a schematic structural diagram illustrating an implementation of a photography-based 3D modeling system according to the present disclosure.

FIG. 2 is a schematic structural diagram illustrating an implementation of a photography-based 3D modeling system according to the present disclosure. As shown in FIG. 2, the photography-based 3D modeling system in the present implementation includes: a photo capture unit 201, configured to capture a first image of each of multiple spaces. Herein, the first image may be, for example, an image used for 3D modeling, including an ordinary photo, a panoramic photo, and a processed (for example, undistorted) panoramic photo. The photo capture unit 201 can be implemented by a photo capture module in the mobile device.

Herein, the photo capture unit 201 can capture multiple second images when moving among the spaces. Herein, the second images may be, for example, images used for positioning, including an ordinary photo, a panoramic photo, and a processed (for example, undistorted) panoramic photo. Herein, the first image and the second image may be the same image, partially identical images, or different images, which is not limited. The image used for positioning herein may also be a photo, a preview image, a video frame, etc., captured by the photo capture unit 201, and may be stored or may be not stored but used only to identify and match feature points.

Herein, for example, the photo capture unit 201 has a positioning sensor and a direction sensor, and can obtain positioning information and direction information when capturing an image used for 3D modeling of the space in which the photo capture unit 201 is located. Here, the positioning sensor may be, for example, one or more of an acceleration sensor, a gyroscope, a linear acceleration sensor, an angular velocity sensor, a gravity sensor, and the like. The direction sensor may be, for example, one or more of a direction sensor, a magnetic sensor, and the like.

A 3D model generation unit 202 is configured to generate a 3D model of each space based on the image used for 3D modeling that is captured by the photo capture unit 201 for each space.

In one or more implementations, for example, the photo capture unit 201 has binocular lenses, and the binocular lenses separately capture the images used for 3D modeling at the same photo capture point; and the 3D model generation unit 202 compares the images used for 3D modeling that are captured by the binocular lenses, determines corresponding pixels, and obtains depth information of each corresponding pixel, so as to generate the 3D model.

Certainly, in one or more implementations, for example, the 3D model generation unit 202 can further predict a depth of each pixel or depths of some pixels in the image used for 3D modeling by using a deep learning method, and calculate a normal direction of each pixel or normal directions of some pixels or predict the normal direction of each pixel or the normal directions of some pixels by directly using the deep learning method, so as to generate a 3D model of each space.

Herein, in one or more implementations, the method for predicting the depth of each pixel in the image used for 3D modeling or predicting the normal direction of each pixel by using the deep learning method may be, for example, a method for training a plane-aware convolutional neural network by predicting a dense depth, a surface normal, and a plane boundary from a single indoor 360° image (for example, refer to Pano Popups: Indoor 3D Reconstruction with a Plane-Aware Network); or a method for predicting a depth from a 360° image through end-to-end learning by using a large-scale three-dimensional dataset, for example, using an approach as described in OmniDepth: Dense Depth Estimation for Indoors Spherical Panoramas or other suitable approaches.

A capture position acquisition unit 203 is configured to obtain position and capture direction information of the photo capture unit 201 when capturing the image used for 3D modeling of each space, and certainly can further obtain a focal length of the lens, a scanning interval of the lens, and other parameters that can affect image content capture, for example, settings for a focal length, a wide-angle lens, or a telephoto lens. If these parameters are incorrect, identification or relative sizes of image content features may be incorrect).

Herein, for example, the capture position acquisition unit 203 can perform feature point matching based on images at adjacent photo capture points among the multiple images used for positioning that are captured by the photo capture unit 201, to obtain relative displacement and capture direction information of each photo capture point, for example, can build a tracking map that includes all photo capture points in the same coordinate system, so as to obtain position and capture direction information of the photo capture unit 201 when capturing the image used for 3D modeling of the space in which the photo capture unit 201 is located.

Herein, for example, the capture position acquisition unit 203 can further obtain, based on positioning information and direction information provided by the photo capture unit 201 when capturing an image used for 3D modeling of a space in which the photo capture unit 201 is located, position and capture direction information of the photo capture unit 201 when capturing the image used for 3D modeling of the space in which the photo capture unit 201 is located.

Herein, the capture position acquisition unit 203 further corrects the tracking map formed by relative displacement and capture direction information based on displacement information such as acceleration information and velocity information or other action/motion information provided by sensors of the photo capture unit 201, including a displacement sensor such as an acceleration sensor or a velocity sensor, and a gyroscope, a barometric pressure sensor or another motion sensor.

A 3D model assembling unit 204 is configured to: based on the position and capture direction information of each space obtained by the capture position acquisition unit 203, assemble the 3D models of the spaces generated by the 3D model generation unit 202 in the global three-dimensional coordinate system, to generate an overall 3D model from the individual 3D models of the spaces.

Herein, the 3D model assembling unit 204 can further convert local coordinates of the 3D model of a single room into global coordinates, for example, by using a transformation matrix based on the position and capture direction information obtained by the capture position acquisition unit 203 when each room is captured, so as to obtain the overall 3D model of all photo capture points.

Herein, the method for converting local coordinates of the 3D model of a single room into global coordinates includes: enabling the photo capture unit 201 to move a predetermined distance, and obtaining, by the capture position acquisition unit 203, coordinates of two endpoints of the predetermined distance (for example, one meter), where a ratio of a difference between the coordinates of the two endpoints to the predetermined distance is the scale of the local coordinates to the global coordinates; or estimating, by using a feature point identified by the capture position acquisition unit 203, a ratio of a height of a plane on which a floor or a ceiling of the space is located to a height of the photo capture unit 201, to obtain the scale of the local coordinates to the global coordinates. Before performing photo capture at a first photo capture point or during movement of subsequent photo capture, the photo capture unit 201 moves a predetermined distance to obtain a predetermined quantity of the feature points.

Herein, for example, the method for estimating the ratio of the height of the plane on which the floor or the ceiling of the space is located to the height of the photo capture unit 201 is projecting the photo capture point vertically onto the floor plane, and then connecting the feature points, e.g., on the floor, so that these three points form a triangle. Assume that the projection line is L1, the line from the photo capture point to the feature point is L2, and the line from the projection point to the feature point is L3. The angle between L1 and L2 is known, e.g., based on the characteristics of the panoramic image, L1 can be calculated by using a trigonometric function based on a length of L3 and the above angle, and a scale is calculated based on an actual height of the camera.

Herein, the predetermined distance needs to satisfy a sufficient distance to obtain a predetermined quantity of feature points.

Specifically, in one or more implementations, for example, the photo capture unit 201 uses a camera or a mobile phone camera only. Because obtained coordinates are all relative values, the coordinates need to be converted into absolute values. In other words, an image comparison algorithm usually has no accurate scale. The coordinates are relative and have no specific size. As a result, displacement and scales calculated from different pictures are inconsistent, causing misalignment. During actual implementation, the above method for converting the coordinates may be as follows:

(a) making a user move a specified distance, for example, one meter, and obtaining coordinates of two endpoints of the movement distance, where a ratio of a difference between the coordinates of the two endpoints to the movement distance is the scale of local coordinates to global coordinates; and (b) estimating, based on a feature point identified by the system, a plane on which a floor or a ceiling of a room is located. Assume that a vertical coordinate axis in the coordinate system is a z-axis, and an equation of the plane is $z=a$. Because the height of the photo capture unit 201 is known, or a height from the photo capture unit 201 to a ceiling is known, which is h, a/h is the scale of the local coordinates to the global coordinates. Herein, because a specific quantity of feature points on the same plane, e.g., floor or ceiling, need to be identified to estimate a value of a, an initialization process can be used during implementation, that is, moving a sufficiently long distance, for example, more than two meters, so that adequate feature points can be accumulated in different environments. The initialization process can be performed prior to the first photo capture point. If the initialization fails, it can be performed again without affecting subsequent photo capture. Alternatively, the initialization process can be performed during movement among subsequent photo capture points.

In the present implementation, for example, the photo capture unit 201 can be implemented by a camera and/or a mobile phone with a photo capture function.

In one or more implementations, for example, the camera and the mobile phone with a photo capture function for implementing the photo capture unit 201 can be attached to attached to the same camera stand; and during movement of the stand, multiple images used for positioning captured by the camera or the mobile phone with a photo capture function are obtained, so as to obtain position and capture direction information of the camera or the mobile phone with a photo capture function when capturing the image used for 3D modeling of the space in which the camera or the mobile phone is located.

Herein, based on a positioning system of the camera or the mobile phone with a photo capture function, the images used for positioning captured by the camera or the mobile phone with a photo capture function can be further used, and feature point matching can be performed based on images used for positioning at adjacent photo capture points to obtain relative displacement and capture direction information of each photo capture point, thereby providing a relative position and direction of each photo capture point.

In one or more implementations, because a position, a direction and a tracking map of the photo capture point are obtained through the mobile phone, and because the camera can be attached to the top of the camera stand by using a screw, the angle between the camera and the mobile phone may be different for each mounting, but the angle remains unchanged during the photo capture of a house. The 3D model of an individual room needs to be rotated by this angle, and then put into the global coordinates based on a position and a capture direction obtained by the mobile phone, to generate an overall 3D model.

Herein, before capturing the image used for 3D modeling of the first space or during movement of subsequent photo capture, the photo capture unit 201 can obtain an angle between a capture direction of a lens of the camera and a capture direction of the mobile phone by using one or more of the following methods:

herein, the capture direction of the lens of the camera may be a direction of one of two fisheye lenses, e.g., front and rear, of a common panoramic camera, or may be a direction of a lens for capturing the first photo by a panoramic camera that captures multiple photos by rotating one lens;

(1) simultaneously running a positioning system based on the mobile phone and a positioning system based on the camera, and moving the stand by a specific distance; in such case, the two systems each provide one displacement vector, and an angle between the two vectors is the angle between the capture direction of the lens of the camera and the capture direction of the mobile phone;

(2) specifying an angle consistent with the capture direction of the mobile phone by manually rotating a preview image or a captured image of the camera;

(3) matching preview images or captured images of the mobile phone and the camera by using an image recognition algorithm, to identify the angle; herein, a possible implementation method for identifying the angle may include at least one of the following ways:

calculating feature points in the images captured by the mobile phone and the camera. For example, use scale-invariant feature transform (SIFT) to find a position difference of the matching feature points in the two images, in order to calculate the angle between capture directions of two lenses; or building visual simultaneous localization and mapping (VSLAM) systems respectively by using video streams captured by the two lenses, where the angle between displacement of the cameras in the two systems is the angle between the capture directions of the lenses;

(4) using an additional mark (including adding a mark to the stand to form a known fixed angle with a mounting direction of the mobile phone), and then identifying the mark in the preview image or the image of the camera, so as to calculate the angle between the capture direction of the lens of the camera and the capture direction of the mobile phone; and (5) using a camera installation interface on the stand so that a known fixed angle is formed between the camera and the mobile phone (mobile device).

Certainly, herein, the position, the direction and the tracking map of the photo capture point can also be calculated from the camera images. In such case, the calculation of the 3D model does not depend on the angle between the camera and the mobile phone. In this case, the mobile phone does not need to be attached to the stand.

Herein, if the camera also has a direction sensor, the angle can be calculated by directly obtaining the directions of the camera and the mobile phone.

The 3D model generation unit 202 is implemented by the mobile phone or by a remote server; when being implemented by the remote server, the 3D model generation unit receives, through a network, one or more images used for 3D modeling, and/or one or more images used for positioning that are captured and sent by the camera and/or the mobile phone with a photo capture function, and/or information obtained by one or more motion sensors, to generate a 3D model of each space.

For example, the capture position acquisition unit 203 can be implemented by the camera or the mobile phone.

Figure 3:
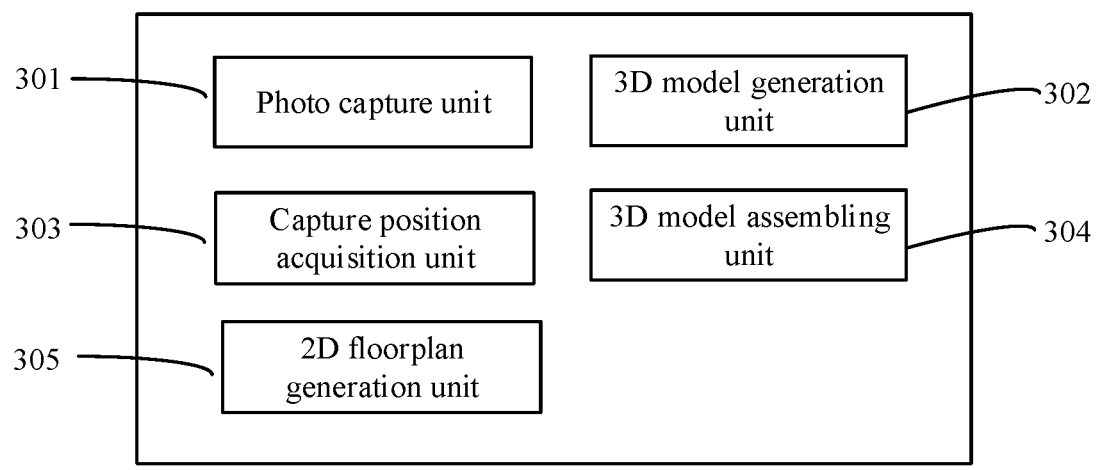
FIG. 3 is a schematic structural diagram illustrating another implementation of a photography-based 3D modeling system according to the present disclosure.

For example, the 3D model assembling unit 204 can be implemented by the mobile phone or by a remote server; when being implemented by the remote server, the 3D model assembling unit 204 receives, through a network, the position and capture direction information of each space sent by the capture position acquisition unit 203, completes the assembling processing based on the position and capture direction information, and sends the generated overall 3D model to the mobile phone or another device. FIG. 3 is a schematic structural diagram illustrating another implementation of a photography-based 3D modeling system according to the present disclosure. As shown in FIG. 3, in the photography-based 3D modeling system in the present implementation, for example, a photography-based 3D modeling space is a room, and an image used for 3D modeling is an indoor image of the room. The photography-based 3D modeling system includes the following:

a photo capture unit 301, configured to capture an image used for 3D modeling of each of multiple rooms.

Herein, the photo capture unit 301 can capture multiple images used for positioning when moving among the rooms.

Herein, for example, the photo capture unit 301 has a positioning sensor and a direction sensor, and can obtain positioning information and direction information when capturing an image used for 3D modeling of the room in which the photo capture unit 301 is located.

A 3D model generation unit 302 is configured to generate a 3D model of each room based on the image used for 3D modeling that is captured by the photo capture unit 301 for each room.

Herein, the 3D model generation unit 302 identifies one or more image areas of at least one of a floor, a ceiling, and a wall in the image used for 3D modeling based on a deep learning method; divides the identified image area(s) into blocks based on an image processing technology, where each block is approximately considered as one plane, image blocks of the floor and the ceiling are located on a horizontal plane, and an image block of the wall is located on a vertical plane; and generates the 3D model by solving an equation for each plane, where for two planes that intersect in the image used for 3D modeling, an error between a calculated intersecting line and an actually observed intersecting line is minimized.

Herein, the 3D model generation unit 302 further uses a computer vision algorithm to identify wall corners in the indoor image and connect the wall corners to generate a rough model of the room.

Herein, in one or more implementations, for example, the method for identifying wall corners in the image may be using the self-supervised training framework of interest point detection and description, for example, using an approach as described in SuperPoint: Self-Supervised Interest Point Detection and Description or other suitable approaches, and then connecting the wall corners to generate a rough model of the room, so as to capture a geometric relationship between objects such as wall corners that frequently appear in the same three-dimensional space structure.

A capture position acquisition unit 303 is configured to obtain position and capture direction information of the photo capture unit 301 when capturing the image used for 3D modeling of each room.

Herein, for example, the capture position acquisition unit 303 can perform feature point matching based on images at adjacent photo capture points among the multiple images used for positioning that are captured by the photo capture unit 301, to obtain relative displacement and capture direction information of each photo capture point, for example, can build a tracking map that includes all photo capture points in the same coordinate system, so as to obtain position and capture direction information of the photo capture unit 301 when capturing the image used for 3D modeling of the room in which the photo capture unit 301 is located.

Herein, for example, the capture position acquisition unit 303 can further obtain, based on positioning information and direction information provided by the photo capture unit 301 when capturing an image used for 3D modeling of a room in which the photo capture unit 301 is located, position and capture direction information of the photo capture unit 301 when capturing the image used for 3D modeling of the room in which the photo capture unit 301 is located.

Herein, the capture position acquisition unit 303 further corrects the tracking map based on acceleration information and velocity information provided by an acceleration sensor and a velocity sensor of the photo capture unit 301.

A 3D model assembling unit 304 is configured to: based on the position and capture direction information of each room obtained by the capture position acquisition unit 303, assemble the 3D models of the rooms generated by the 3D model generation unit 302 in the global three-dimensional coordinate system, to generate an overall 3D model from the individual 3D models of the rooms.

Herein, the 3D model assembling unit 304 can further convert local coordinates of the 3D model of a single room into global coordinates, for example, by using a transformation matrix based on the position and capture direction information obtained by the capture position acquisition unit 303 when each room is captured, so as to obtain the overall 3D model of all photo capture points.

Herein, the 3D model assembling unit 304 can perform a correction on 3D models of the multiple rooms, including correcting wall line directions of all rooms by using a statistical method. For indoor scenes, in most cases, walls of each room meet the parallel and vertical relationships. By finding an average or median of the wall line directions of each room, or using algorithms such as Random Sample Consensus (RANSAC) to identify the most possible wall line direction, the rooms with errors within a specific range are adjusted to the same direction, so that wall lines of all rooms are made parallel if they were within a specific error range prior to correction.

Herein, when assembling the 3D models of the rooms, the 3D model assembling unit 304 can further correct one or more overlapping parts and/or gaps. Herein, the correction method may include at least one of the following ways:

Assuming that the position of the room is accurate, but there is an error in outline recognition, the overlapping part is trimmed and the gap is filled.

Assuming that the outline of the room is recognized accurately, but there is an error in the position, the position of each room is moved to eliminate the overlap and the gap as far as possible.

Certainly, in practice, the two methods can be performed repeatedly and iteratively to get close to the real situation.

A 2D floorplan generation unit 305 is configured to generate a 2D floorplan in the following ways:

1. projecting each surface of the generated 3D model onto a plane parallel to the floor, and merging these projections into a polygon;

2. correcting and simplifying the obtained polygon, which may include, for example, the following methods:

(1) retaining only main vertices of the polygon and deleting small concave or convex rectangles; for example, concave or convex rectangles less than the standard wall thickness, e.g., 12 cm or 24 cm, can be deleted; and (2) using a computer vision algorithm to detect straight lines in the picture, and then determining the direction of a wall, and aligning edges that are approximately parallel or perpendicular to the direction of the wall to corresponding directions;

certainly, the obtained polygon can be corrected and simplified in other ways, which is not limited to the above approaches;

3. assembling the generated 2D floorplans of the rooms in the same two-dimensional coordinate system based on the position and capture direction information of each room obtained by the capture position acquisition unit 303, to generate an overall 2D floorplan from the individual 2D floorplans of the rooms; and 4. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property by the photo capture unit 301.

Herein, in one or more implementations, for example, the method for identifying the position of the door and/or the window on the indoor image by using the deep learning method may be detecting each target object such as the door and/or the window by using YOLO (You Only Look Once: Unified, Real-Time Object Detection).

Herein, the 2D floorplan generation unit 305 can further correct 2D floorplans of the multiple rooms, including correcting wall line directions of all the rooms by using a statistical method, so that wall lines of all the rooms are aligned in the same direction if they were parallel within a specific error range. Herein, the uniform correction method may be the same as that described above, and details are omitted for simplicity.

Herein, when assembling the 2D floorplans of the rooms, the 2D floorplan generation unit 305 can further correct one or more overlapping parts and/or gaps.

Herein, the 2D floorplan generation unit can further generate a 2D floorplan in the following ways:

1. projecting each surface of the overall 3D model generated by the 3D model assembling unit 304 onto a plane parallel to the floor, and merging these projections into one or more polygons;

2. correcting and simplifying the obtained polygon(s), which may include, for example, the following methods:

(1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions;

certainly, the obtained polygon can be corrected and simplified in other ways, which is not limited to the above approaches; and 3. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property by the photo capture unit 301.

Herein, in one or more implementations, for example, the method for identifying the position of the door and/or the window on the indoor image by using the deep learning method may be YOLO (You Only Look Once: Unified, Real-Time Object Detection).

Photography-Based 3D Modeling Method

Figure 4:
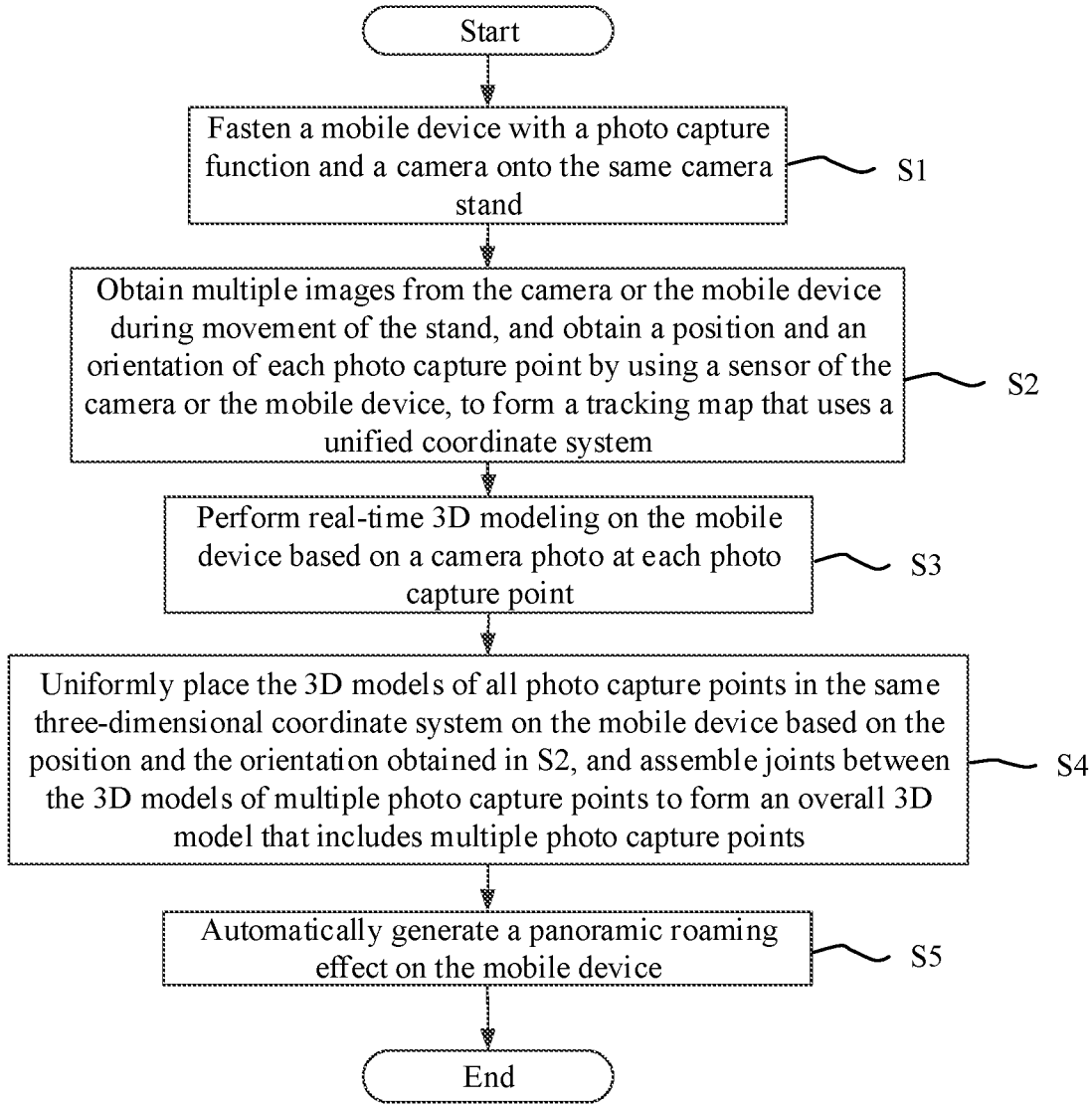
FIG. 4 is a schematic flowchart illustrating an implementation of a photography-based 3D modeling method according to the present disclosure.

FIG. 4 is a schematic flowchart illustrating a photography-based 3D modeling method according to the present disclosure.

Referring to FIG. 4, the photography-based 3D modeling method provided in the present disclosure includes the following steps:

(S1) attaching a mobile device (including a mobile phone, a tablet computer, etc.) with a photo capture function and/or a camera (including a panoramic camera, a fisheye camera, and an ordinary digital camera) to the same camera stand (including a tripod).

(S2) Obtaining multiple images used for positioning from the camera or the mobile device during movement of the stand, and obtaining a position and a capture direction of each photo capture point by using an image processing algorithm and/or one or more sensors of the camera or the mobile device, to build a tracking map that uses a global coordinate system.

Herein, step S2 uses a positioning system of the mobile device or the camera and performs feature point matching based on second images captured by the mobile device or the camera at adjacent photo capture points, to identify relative displacement and capture direction information of the photo capture points, in order to build a tracking map that includes all photo capture points in the same coordinate system and provides a position and a direction of each photo capture point.

Herein, step S2 further includes correcting the tracking map from obtaining information that includes acceleration, velocity, and direction of movement by using one or more sensors of the mobile device or the camera.

Herein, step S2 further includes obtaining an angle between a capture direction of a lens of the camera and a capture direction of the mobile device, where at an initialization stage, the positioning system based on the mobile device and the positioning system based on the camera run simultaneously, and the stand is moved by a specific distance; in such case, the two systems each provide one displacement vector, and an angle between the two vectors is the angle between the capture direction of the lens of the camera and the capture direction of the mobile device; an angle consistent with the capture direction of the mobile device is specified by manually adjusting the camera and the mobile device to angles with consistent orientation, for example, by rotating a preview image or a captured image of the camera; preview images or captured images of the mobile device and the camera are matched by using an image recognition algorithm, to identify the angle; or an additional mark is used (including adding a mark to the stand to form a fixed angle with a mounting direction of the mobile device), and then the mark is identified in the preview image or the image of the camera, so as to calculate the angle between the capture direction of the lens of the camera and the capture direction of the mobile device.

(S3) Generating 3D models on the mobile device or a remote server by using a deep learning algorithm or other methods based on an image used for 3D modeling that is captured at each photo capture point, to obtain a 3D model and/or a 2D floorplan of each photo capture point.

Herein, step S3 includes the following:

(S31) identifying one or more image areas of at least one of a floor, a ceiling, and a wall in the image based on a deep learning method; and (S32) dividing the identified image area(s) into blocks based on an image processing technology, where each block is approximately considered as one plane, image blocks of the floor and the ceiling are located on a horizontal plane, and an image block of the wall is located on a vertical plane; and generating the 3D model by solving an equation for each plane, where for two planes that intersect in the image, an intersecting line of the two planes is used as a constraint, so that an error between a calculated intersecting line and an actually observed intersecting line is minimized.

Herein, step S3 further includes: using a computer vision algorithm to identify wall corners in an indoor image, and connecting the wall corners to generate a rough model of a room. Herein, in one or more implementations, for example, the method for identifying wall corners in the image may be using the training framework of self-supervised interest point detection and description, for example, using an approach described in SuperPoint: Self-Supervised Interest Point Detection and Description or other suitable approaches, and then connecting the wall corners to generate a rough model of the room, so as to capture a geometric relationship between objects such as wall corners that frequently appear in the same three-dimensional space structure.

(S4) Placing the individual 3D models of all photo capture points in the global three-dimensional coordinate system based on the position and the capture direction obtained in S2; connecting individual 3D models of multiple photo capture points to generate an overall 3D model and/or 2D floorplan of the multiple photo capture points; and correcting wall directions of all rooms and optimizing the overlap(s) and gap(s). In popular room types, rooms are usually composed of parallel walls, however, when generating a room model generated from a single photo capture point, wall that are actually parallel may have an error in their directions (non-parallel); by considering the wall directions of multiple rooms, a uniform direction is identified and the wall directions of all rooms are adjusted based on the uniform direction.

Herein, step S4 includes the following:

(S41) converting local coordinates of a 3D model of a single photo capture point into global coordinates, for example, by using a transformation matrix based on the position and the capture direction of each photo capture point, so as to obtain an overall 3D model of all photo capture points;

(S42) performs a correction on the 3D models of multiple photo capture points, including correcting wall line directions of all photo capture points by using a statistical method, so that wall lines of all rooms are aligned in the same direction if they were parallel within a specific error range; and (S43) when assembling the 3D models of the photo capture points, correcting one or more overlapping parts and/or gaps.

(S5) automatically generating a virtual roaming effect between panoramic images on the mobile device.

The following describes application of the photography-based 3D modeling method in the present implementation with reference to the photography-based 3D modeling system.

I. Hardware System

In the present implementation, the mobile phone and the camera are attached to the same stand (including a tripod, etc.).

II. System Initialization

In the present disclosure, one of the following two methods is used to obtain the capture position of each photo capture point and the capture direction of the camera:

Method (1): Based on the positioning system of the mobile phone, that is, using the images (photos, videos or preview images) of the mobile phone, feature point matching is performed based on images at adjacent photo capture points to identify displacement of the photo capture points, and the sensors (including a gyroscope, an accelerometer, a compass, or other inertial sensors, etc.) of the mobile device are preferably used for correction, so as to build a tracking map and provide positions and directions of the photo capture points.

Method (2): Based on the positioning system of the camera, that is, using the images (photos, videos or preview images) of the camera, feature point matching is performed based on images at adjacent photo capture points to identify displacement of the photo capture points; preferably, continuous feature matching and positioning are performed with photo capture points centimeters or decimeters apart, with corrections done using sensor data (such as a gyroscope, an accelerometer, a compass, etc.) of the camera, so as to build a tracking map and provide positions and directions of the photo capture points.

Comparison of the two methods: Method (1) is based on the mobile phone system. Because the mobile phone has multiple sensors, it can often provide absolute coordinate information that is relatively accurate, and can measure an absolute distance between the photo capture points. However, this method requires an additional initialization process prior to usage.

In method (2), because the camera often does not have good built-in sensors, it can provide only relative coordinates of the capture position. It does not require additional initialization to align the coordinate axis of the 3D model of a single photo capture point with the track generated; in addition, the capture path comes around to form a loop, this method may provide smaller positioning errors.

When method (1) is used, the coordinates provided by the mobile phone are based on the local coordinate system of the mobile phone (generally, one axis points in a direction pointing perpendicularly to the ground, and the other two axes point in the front-rear and left-right directions, respectively). However, the coordinate system of the 3D model generated based on panoramic photos is based on the coordinate system of the camera. The coordinate axes of the mobile phone and the camera do not align with each other. To solve this problem, the system needs to be initialized manually or automatically. A manual or automatic method can be used:

Manual method: A user uses an additional measurement tool or adds a mark on a device such as the stand, or manually enters an angle between the capture direction of the lens of the camera and the capture direction of the mobile phone.

Automatic method: at the initialization stage method (1) and method (2) are performed simultaneously, and the device is moved by a specific distance, preferably 1 to 3 meters. In such case, the two systems each can provide one system displacement vector, and an angle between the two vectors is the angle between the capture direction of the lens of the camera and the capture direction of the mobile phone.

III. Determining the Position of a Photo Capture Point and the Capture Direction After starting running, the above system can provide position and capture direction information of the photo capture unit.

IV. Generation of a 3D Model for a Single Photo Capture Point

There are two conventional photography-based modeling methods, both of which have obvious disadvantages.

In conventional method (a), a camera that can record depth information is used to directly generate a 3D model. Such method relies on more complex hardware, resulting in higher equipment costs, and usually operated by professional photographers. As a result, this method has disadvantages for wide adoption.

In conventional method (b), two photos are captured respectively at two photo capture points that are close to each other. Preferably, continuous feature matching and positioning are performed with photo capture points centimeters or decimeters apart. Subsequently, Multi View Stereo (MVS) (for details, refer to https://github.com/cdcseacave/openMVS) is utilized for modeling. The advantage is that the entire process is fully automatic without manual intervention. However, there are disadvantages.

Disadvantage 1: It is computation intensive, and as a result rapid modeling cannot be easily achieved on a mobile device. Photos usually need to be uploaded to a server (cloud/PC) to run modeling algorithms benefiting from stronger computing capacities.

Disadvantage 2: It is difficult to specify how far photo capture points should be apart from each other. If the photo capture points are too dense, operations become inconvenient and time-consuming. If photo capture points are selected simply based on unobstructed line of sight between two adjacent photo capture points or by "feeling right", modeling may fail, and no warning can be provided for users during photo capture.

To overcome the above disadvantages, the present disclosure uses an innovative method: To improve the timeliness of model generation and to achieve a WYSIWYG (What You See Is What You Get) experience, 3D model generation typically only include room outlines (wall positions), without including models of furniture and decorations that are not essential to the room structure. To be specific, i. Areas such as a floor, a ceiling, a wall, and a roof in the image are identified by using deep learning method. For a plane on which one of these areas is located, either its normal direction (as in the case of the floor and ceiling) is known or its normal is on a horizontal plane (as in the case of a wall).

ii. The image is divided into blocks by using image processing technology, where each block can be approximately considered as one plane. For a block of the floor, the plane equation is known. Assuming that the y-axis is pointing up vertically, the equation of the block of the floor is $y+1=0$. For a block of the wall, the plane equation is $Ax+Cz+D=0$. For a block of the ceiling, the plane equation is $y+D=0$. For other blocks, the plane equation is $Ax+By+Cz+D=0$. The process of generating a 3D model is that of solving these plane equations. For two planes that intersect in the image, there is an intersecting line visible in the image. Using the intersecting line as a constraint, the above equation solving process can be changed into a problem of minimization, so that for the two planes that intersect, an error between a calculated intersecting line and an actually observed intersecting line is minimized.

iii. Other methods can also be used to model a scene. For example, in an indoor scene, a computer vision algorithm can be combined with deep learning to identify wall corners in an image, and the wall corners can then be connected to generate a rough model of a room. Herein, in one or more implementations, for example, the method for identifying wall corners in the image may be using the training framework of self-supervised interest point detection and description (for example, refer to SuperPoint: Self-Supervised Interest Point Detection and Description), and then connecting the wall corners to generate a rough model of the room, so as to capture the geometric relationship between objects such as wall corners that frequently appear in the same three-dimensional space structure.

iv. A 2D floorplan is generated. After a 3D model of each photo capture point is obtained, a floorplan can be further generated. This is especially useful for applications of indoor scenes where a floorplan is often desired. The method is as follows:

1. Project each surface of the 3D model onto a 2D top view plane.
2. Merge these projections into a large polygon.
3. Correct and simplify the obtained polygon, which may include, for example, the following methods:

(a) The obtained polygon usually has a large quantity of points, and the polygon can be simplified. Only the vertices of the polygon on the 2D floorplan are retained, and small concave or convex rectangles are deleted.

(b) For an indoor scene, a computer vision algorithm can be used to detect straight lines in the picture, and which are then used to determine the direction of a wall. Edges that are approximately parallel or perpendicular to the direction of the wall are aligned to corresponding directions.

4. Identify a door and/or a window. For an indoor scene, the door and/or the window need/needs to be marked on the 2D floorplan by using the following two methods:

(a) The deep learning method is directly used to identify the position and size of a door and/or a window in a panoramic image.

Herein, in one or more implementations, for example, the method for identifying the position and the size of the door and/or the window on the indoor image by using the deep learning method may be YOLO (You Only Look Once: Unified, Real-Time Object Detection).

(b) Because the positioning system based on the mobile phone or the camera not only provides a position and a capture direction of each photo capture point, but also has a movement track of the camera for the entire photo capture process. Where the track crosses the room outline can positively identify the position of the door.

V. Generation of 3D Models and 2D Floorplans for Multiple Photo Capture Points

In step 4, a 3D model of each photo capture point is generated. Coordinates of the obtained 3D models are all relative coordinates with respect to the photo capture points. In order to assemble these models and to generate an overall 3D model and a 2D floorplan, first, local coordinates of a single model are converted into global coordinates, for example, by using a transformation matrix based on a known position and capture direction of each photo capture point.

On top of the above, further corrections can be made to the model and the floorplan.

i. The line directions are often inaccurate when generating the model of an individual photo capture point. After multiple points are captured, all photo capture points can be corrected collectively by using a statistical method such as Random Sample Consensus (RANSEC) to identify best line direction, so that wall lines of all the rooms are aligned in the same direction if they were parallel within a specific error range, that is, small inconsistencies of wall line directions can thus be avoided.

ii. Due to errors introduced in model generation, there may be one or more overlaps, gaps, etc. when 3D models and 2D floorplans of multiple photo capture points are placed next to each other. Overlaps can be automatically removed and gaps can be filled on the 2D floorplan.

VI. Timely Showing of Results

The above process can be performed automatically and entirely on a mobile phone. Following completion, 3D models, 2D floorplans and virtual roaming become readily available on the mobile phone, and can be uploaded to the cloud to be shared with others.

VII. Manual Editing

Since errors may be introduced by the positioning system, the 3D modeling algorithm for a single photo capture point, and various phases of optimizing the 3D models/2D floorplans of multiple photo capture points, in order to obtain a 3D model with higher precision, the present disclosure allows a user to manually edit the photo capture result. Manual editing can be performed by using software-based review and editing tools.

Automatic 3D Modeling Apparatus

Figure 5:
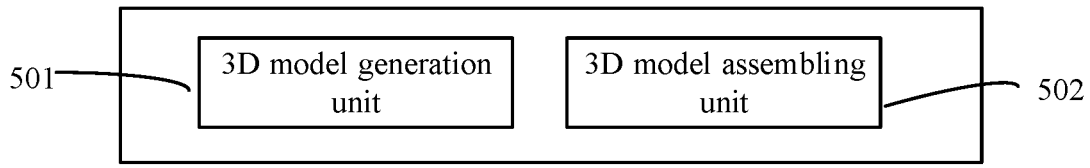
FIG. 5 is a schematic structural diagram illustrating an implementation of an automatic 3D modeling apparatus according to the present disclosure.

FIG. 5 is a schematic structural diagram illustrating an implementation of an automatic 3D modeling apparatus according to the present disclosure. As shown in FIG. 5, the automatic 3D modeling apparatus includes the following:

a 3D model generation unit 501, configured to: based on an image used for 3D modeling of each of multiple spaces included in a modeling object, generate a 3D model of each space; and a 3D model assembling unit 502, configured to: based on position and capture direction information when the image used for 3D modeling of each of the multiple spaces is captured, assemble the 3D models of the spaces generated by the 3D model generation unit 501 in the global three-dimensional coordinate system, to generate an overall 3D model from the individual 3D models of the spaces.

Herein, the 3D model assembling unit 502 can further convert local coordinates of the 3D model of a single space into global coordinates, for example, by using a transformation matrix based on the position and capture direction information, so as to obtain the overall 3D model of all spaces.

Figure 6:
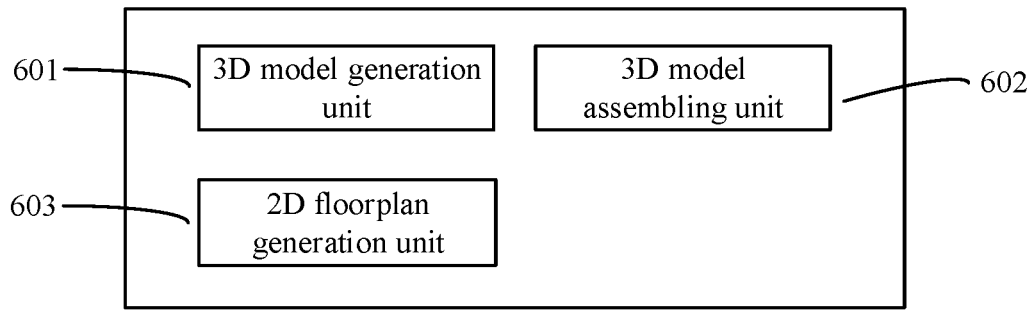
FIG. 6 is a schematic structural diagram illustrating another implementation of an automatic 3D modeling apparatus according to the present disclosure.

FIG. 6 is a schematic structural diagram illustrating another implementation of an automatic 3D modeling apparatus according to the present disclosure. In the present implementation, for example, an automatic 3D modeling space is a room, and an image used for 3D modeling is an indoor image of the room.

As shown in FIG. 6, the present implementation includes a 3D model generation unit 601, configured to: based on an image used for 3D modeling of each of multiple rooms included in a modeling object, generate a 3D model of each room.

Herein, the 3D model generation unit 601 identifies one or more image areas of at least one of a floor, a ceiling, and a wall in the image used for 3D modeling based on a deep learning method; divides the identified image area(s) into blocks based on an image processing technology, where each block is approximately considered as one plane, image blocks of the floor and the ceiling are located on a horizontal plane, and an image block of the wall is located on a vertical plane; and generates the 3D model by solving an equation for each plane, where for two planes that intersect in the image used for 3D modeling, an error between a calculated intersecting line and an actually observed intersecting line is minimized.

Herein, the 3D model generation unit 601 further uses a computer vision algorithm to identify wall corners in the indoor image and connect the wall corners to generate a rough model of the room. Herein, in one or more implementations, for example, the method for identifying wall corners in the image may be using the training framework of self-supervised interest point detection and description, for example, using an approach as described in SuperPoint: Self-Supervised Interest Point Detection and Description or other suitable approaches, and then connecting the wall corners to generate a rough model of the room, so as to capture a geometric relationship between objects such as wall corners that frequently appear in the same three-dimensional space structure.

A 3D model assembling unit 602 is configured to: based on position and capture direction information when the image used for 3D modeling of each of the multiple rooms is captured, assemble the individual 3D models of the rooms generated by the 3D model generation unit 601 in the global three-dimensional coordinate system, to generate an overall 3D model from the individual 3D models of the rooms.

Herein, the 3D model assembling unit 602 can further convert local coordinates of the 3D model of a single room into global coordinates, for example, by using a transformation matrix based on the position and capture direction information, so as to obtain the overall 3D model of all rooms.

Herein, the 3D model assembling unit 602 can further correct 3D models of the multiple rooms, including correcting wall line directions of all rooms by using a statistical method, so that wall lines of all rooms are aligned in the same direction if they were parallel within a specific error range.

Herein, when assembling the 3D models of the rooms, the 3D model assembling unit 602 can further correct one or more overlapping parts and/or gaps.

A 2D floorplan generation unit 603 is configured to generate a 2D floorplan in the following ways:

1. projecting each surface of the generated 3D model onto a plane parallel to the floor, and merging these projections into a polygon;

2. correcting and simplifying the obtained polygon, which may include, for example, the following methods:

(1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions;

certainly, the obtained polygon can be corrected and simplified in other ways, which is not limited to the above approaches;

3. assembling the generated 2D floorplans of the rooms in the same two-dimensional coordinate system based on the position and capture direction information, to generate an overall 2D floorplan from the individual 2D floorplans of the rooms; and 4. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

Herein, in one or more implementations, for example, the method for identifying the position and the size of the door and/or the window on the indoor image by using the deep learning method may be YOLO (You Only Look Once: Unified, Real-Time Object Detection).

Herein, the 2D floorplan generation unit 603 can further correct 2D floorplans of the multiple rooms, including correcting wall line directions of all the rooms by using a statistical method, so that wall lines of all the rooms are aligned in the same direction if they were parallel within a specific error range.

Herein, when assembling the 2D floorplans of the rooms, the 2D floorplan generation unit 603 can further correct one or more overlapping parts and/or gaps.

Herein, the 2D floorplan generation unit 603 can further generate a 2D floorplan in the following ways:

1. projecting each surface of the overall 3D model generated by the 3D model assembling unit 602 onto a plane parallel to the floor, and merging these projections into one or more polygons;

2. correcting and simplifying the obtained polygon(s), which may include, for example, the following methods:

(1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions;

certainly, the obtained polygon can be corrected and simplified in other ways, which is not limited to the above approaches; and 3. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property. For example, the specific method is using the above YOLO model. Details are omitted herein for simplicity.

Automatic 3D Modeling Method

Figure 7:
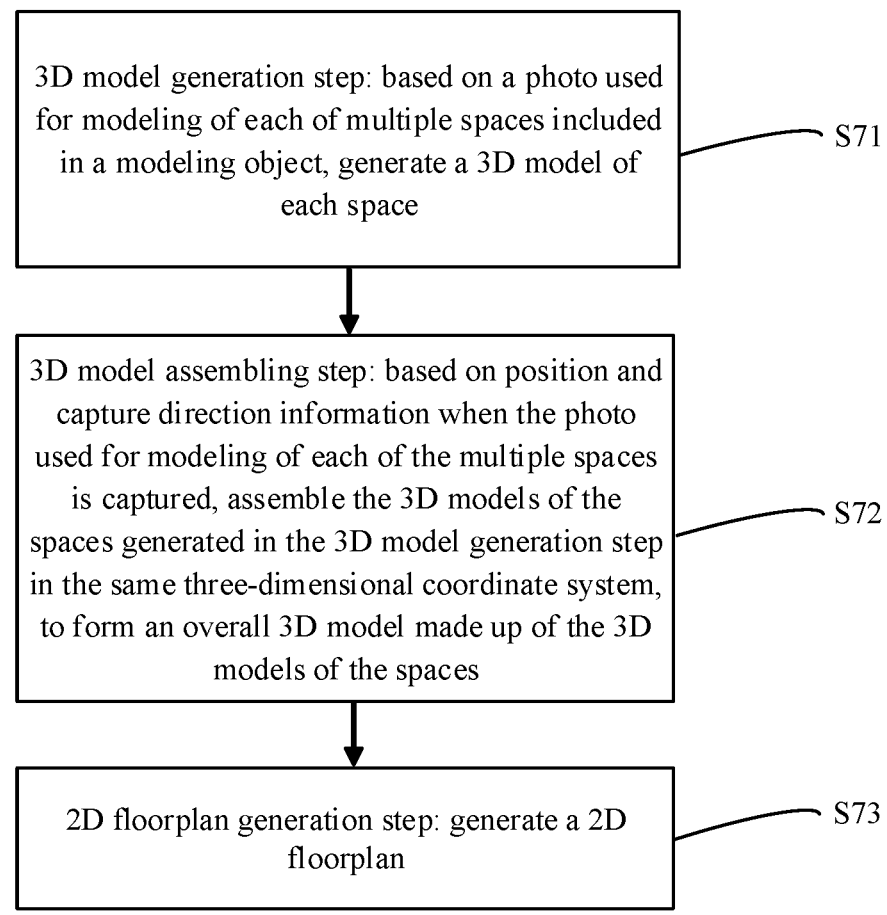
FIG. 7 is a schematic flowchart illustrating an implementation of an automatic 3D modeling method according to the present disclosure.

FIG. 7 is a schematic flowchart illustrating an implementation of an automatic 3D modeling method according to the present disclosure. As shown in FIG. 7, the automatic 3D modeling method includes the following:

3D model generation step S71: based on an image used for 3D modeling of each of multiple spaces included in a modeling object, generate a 3D model of each space.

In the present implementation, for example, an automatic 3D modeling space is a room, and an image used for 3D modeling is an indoor image of the room.

In the 3D model generation step S71, one or more image areas of at least one of a floor, a ceiling, and a wall in the image used for 3D modeling are identified based on a deep learning method; the identified image area(s) is divided into blocks based on an image processing technology, where each block is approximately considered as one plane, image blocks of the floor and the ceiling are located on a horizontal plane, and an image block of the wall is located on a vertical plane; and the 3D model is generated by solving an equation for each plane, where for two planes that intersect in the image used for 3D modeling, an error between a calculated intersecting line and an actually observed intersecting line is minimized.

In the 3D model generation step S71, a computer vision algorithm is further used to identify wall corners in the indoor image and the wall corners are connected to generate a rough model of the room. Herein, in one or more implementations, for example, the method for identifying wall corners in the image may be using the training framework of self-supervised interest point detection and description, for example, using an approach as described in SuperPoint: Self-Supervised Interest Point Detection and Description or other suitable approaches, and then connecting the wall corners to generate a rough model of the room, so as to capture a geometric relationship between objects such as wall corners that frequently appear in the same three-dimensional space structure.

3D model assembling step S72: based on position and capture direction information when the image used for 3D modeling of each of the multiple rooms is captured, assemble the 3D models of the rooms generated in the 3D model generation step S71 in the global three-dimensional coordinate system, to generate an overall 3D model from the individual 3D models of the rooms.

Herein, in the 3D model assembling step S72, local coordinates of the 3D model of a single space can be further converted into global coordinates, for example, by using a transformation matrix based on the position and capture direction information, so as to obtain the overall 3D model of all spaces.

2D floorplan generation step S73: generate a 2D floorplan in the following ways:

1. projecting each surface of the generated 3D model onto a plane parallel to the floor, and merging these projections into a polygon;

2. correcting and simplifying the obtained polygon, which may include, for example, the following methods:

(1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions;

herein, the obtained polygon can be corrected and simplified in other ways, which is not limited to the above approaches; and 3. assembling the generated 2D floorplans of the rooms in the same two-dimensional coordinate system based on the position and capture direction information, to generate an overall 2D floorplan from the individual 2D floorplans of the rooms; and 4. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property. For example, the specific method is using the above YOLO model. Details are omitted herein for simplicity.

Herein, in the 2D floorplan generation step S73, 2D floorplans of the multiple rooms can be further corrected, including correcting wall line directions of all the rooms by using a statistical method, so that wall lines of all the rooms are aligned in the same direction if they were parallel within a specific error range.

Herein, in the 2D floorplan generation step S73, when the 2D floorplans of the rooms are assembled, one or more overlapping parts and/or gaps can be further corrected.

Herein, in the 2D floorplan generation step S73, a 2D floorplan can be further generated in the following ways:

1. projecting each surface of the overall 3D model generated in the 3D model assembling step S72 onto a plane parallel to the floor, and merging these projections into one or more polygons;

2. correcting and simplifying the obtained polygon(s), which may include, for example, the following methods:

(1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions;

certainly, the obtained polygon can be corrected and simplified in other ways, which is not limited to the above approaches;

3. identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property. For example, the specific method is using the above YOLO model. Details are omitted herein for simplicity.

Electronic Device

Figure 8:
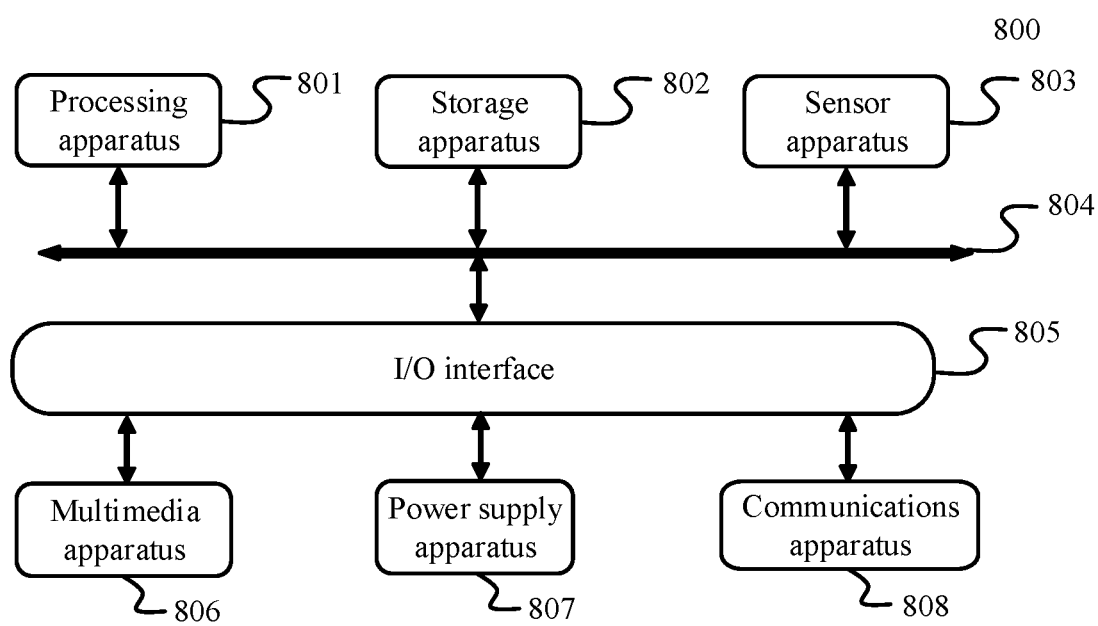
FIG. 8 is a schematic structural diagram illustrating an implementation of an electronic device according to the present disclosure.

FIG. 8 is a schematic structural diagram illustrating an electronic device (for example, the mobile device or the server in FIG. 1) 800 that is suitable for implementing an implementation of the present disclosure. The electronic device in the implementation of the present disclosure may be any mobile device in the above system, and be preferably a mobile device with a photo capture function. The electronic device is attached to a stand (such as a tripod) independently or jointly with another electronic terminal device such as a camera, to cooperate with application software running in various mobile operating systems to implement the implementation method in the present disclosure. The electronic device shown in FIG. 8 is merely an example, and shall not impose any limitation on a function and an application scope of the implementations of the present disclosure.

As shown in FIG. 8, the electronic device 800 can include a processing apparatus (such as a central processing unit and a graphics processing unit) 801 for controlling an overall operation of the electronic device. The processing apparatus can include one or more processors for executing instructions to perform all or some of the steps of the above method. In addition, the processing apparatus 801 can include one or more modules to process interaction with other apparatuses or units.

A storage apparatus 802 is configured to store various types of data. The storage apparatus 802 can include various types of computer-readable storage media or a combination thereof. For example, the storage apparatus 802 can be an electrical, magnetic, optical, electromagnetic, infrared, or semiconductor system, apparatus, or device, or any combination thereof. More specific examples of the computer-readable storage media can include but are not limited to an electrical connection with one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program. The program may be used by or in combination with an instruction execution system, apparatus, or device.

A sensor apparatus 803 is configured to perceive specified and measured information and convert the information into a usable output signal according to a specific rule. One or more sensors can be included. For example, the sensor apparatus 803 can include an acceleration sensor, a gyroscope sensor, a magnetic sensor, a pressure sensor, or a temperature sensor, etc., which are used to detect changes in the on/off state, relative positioning, acceleration/deceleration, temperature, humidity, and light of the electronic device.

The processing apparatus 801, the storage apparatus 802, and the sensor apparatus 803 are connected to each other by using a bus 804. An input/output (I/O) interface 805 is also connected to the bus 804.

A multimedia apparatus 806 can include input devices such as a touchscreen, a touch pad, a keyboard, a mouse, a camera, and a microphone to receive an input signal from a user. Various input devices can cooperate with various sensors of the sensor apparatus 803 to complete a gesture operation input, an image recognition input, a distance detection input, etc. The multimedia apparatus 806 can further include output devices such as a liquid crystal display (LCD), a speaker, and a vibrator.

A power supply apparatus 807 is configured to supply power to various apparatuses in the electronic device, and can include a power management system, one or more power supplies, and a component that distributes power to other devices.

A communications apparatus 808 may allow the electronic device 800 to perform wireless or wired communication with other devices to exchange data.

The above various apparatuses can also be connected to the I/O interface 805 to implement application of the electronic device 800.

Although FIG. 8 shows the electronic device 800 having various apparatuses, it should be understood that not all shown apparatuses need to be implemented or included. More or fewer apparatuses can be implemented or included alternatively.

In particular, according to the implementations of the present disclosure, the process described above with reference to the flowchart can be implemented as a computer software program. For example, the implementations of the present disclosure include a computer program product that includes a computer program that is carried on a non-transient computer readable medium. The computer program includes program code for performing the method shown in the flowchart. In such an implementation, the computer program can be downloaded and installed from a network by using the communications apparatus, or installed from the storage apparatus. When the computer program is executed by the processing apparatus, the above functions defined in the method in the implementations of the present disclosure are executed.

In the context of the present disclosure, a machine-readable medium can be a tangible medium, which can contain or store a program for use by or in combination with an instruction execution system, apparatus, or device.

It should be noted that, the above computer-readable medium in the present disclosure can be a computer-readable signal medium or a computer-readable storage medium, or any combination thereof. In the present disclosure, the computer-readable signal medium can include a data signal that is propagated in a baseband or as a part of a carrier, and carries computer-readable program code. Such propagated data signal may take a plurality of forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or in combination with an instruction execution system, apparatus, or device. The program code included in the computer-readable medium can be transmitted in any suitable medium, including but not limited to a cable, an optical cable, radio frequency (RF), or the like, or any suitable combination of the above.

The above computer-readable medium may be included in the above electronic device, or may exist alone without being assembled into the electronic device.

Computer program code for performing an operation of the present disclosure can be written in one or more program design languages or a combination thereof. The above program design languages include but are not limited to object-oriented program design languages such as Java, Smalltalk, and C++, and conventional procedural program design languages such as C or a similar program design language. The program code can be executed entirely on a user computer, partly on a user computer, as a separate software package, partly on a user computer and partly on a remote computer, or entirely on a remote computer or server. In a case involving a remote computer, the remote computer can be connected to a user computer through any type of network. Alternatively, the remote computer can be connected to an external computer (for example, by using an Internet service provider for connection over the Internet).

The flowcharts and block diagrams in the accompanying drawings show the architectures, functions, and operations that may be implemented according to the systems, methods, and computer program products in various implementations of the present disclosure. In this regard, each block in the flowchart or block diagram may represent one module, one program segment, or one part of code. The module, the program segment, or the part of code includes one or more executable instructions for implementing specified logical functions. It should also be noted that, in some alternative implementations, the functions marked in the blocks may occur in an order different from that marked in the figures. For example, two consecutive blocks can actually be executed in parallel, and sometimes they can also be executed in reverse order, depending on the function involved. It should also be noted that, each block in the block diagram and/or flowchart, and a combination of blocks in the block diagram and/or flowchart can be implemented by using a dedicated hardware-based system that performs a specified function or operation, or can be implemented by using a combination of dedicated hardware and computer instructions.

The units described in the implementations of the present disclosure can be implemented by software or hardware. In some cases, a name of a unit does not constitute a restriction on the unit.

The functions described above in the specification can be performed at least in part by one or more hardware logic components. For example, without limitation, exemplary types of hardware logic components that can be used include a field programmable gate array (FPGA), an application-specific integrated circuit (ASIC), an application-specific standard product (ASSP), a system on chip (SoC), a complex programmable logic device (CPLD), etc.

The above descriptions are only the preferred implementations of the present disclosure and the explanation of the applied technical principles. A person skilled in the art should understand that, the disclosure scope of the present disclosure is not limited to the technical solutions formed by the specific combination of the above technical features, but should also cover other technical solutions formed by any combination of the above technical features or their equivalent features without departing from the above disclosed concepts, for example, a technical solution formed by interchanging the above features and the technical features that are disclosed (but not limited thereto) in the present disclosure having similar functions.

In addition, although the operations are depicted in a specific order, it should not be construed that these operations need to be performed in the specific order shown or sequentially. In a specific environment, multi-tasking and concurrent processing may be advantageous. Likewise, although some specific implementation details are included in the above discussion, these details should not be construed as a limitation on the scope of the present disclosure. Some features that are described in the context of separate implementations can also be implemented in combination in a single implementation. Conversely, various features that are described in the context of a single implementation can also be implemented in multiple implementations separately or in any suitable sub-combination.

Although the subject matter has been described in languages specific to structural features and/or methodological logical actions, it should be understood that the subject matter defined in the appended claims is not necessarily limited to the specific features or actions described above. On the contrary, the specific features and actions described above are merely exemplary forms of the implementations.

The implementation can be further appreciated through the below embodiments.

In an embodiments, an automatic 3D modeling apparatus includes a 3D model generation unit, configured to: based on a first image of each of multiple spaces included in a modeling object, generate a 3D model of each space of the multiple spaces; and a 3D model assembling unit, configured to: based on position and capture direction information of the first image of each of the multiple spaces being captured, assemble 3D models of the multiple spaces generated by the 3D model generation unit in a global three-dimensional coordinate system, to generate an overall 3D model from the individual 3D models of the spaces.

The foregoing and other described embodiments can each, optionally, include one or more of the following features:

A first feature, combinable with any of the other features, specifies that the 3D model assembling unit converts local coordinates of the 3D model of a single space into global coordinates based on the position and capture direction information, so as to obtain the overall 3D model of all the spaces.

A second feature, combinable with any of the other features, specifies that the space is a room; the first image is an indoor image of the room; the 3D model generation unit identifies one or more image areas of at least one of a floor, a ceiling, and a wall in the first image based on a deep learning method; divides the identified image area(s) into blocks based on an image processing technology, wherein each block is approximately considered as one plane, image blocks of the floor and the ceiling are located on a horizontal plane, and an image block of the wall is located on a vertical plane; and generates the 3D model by solving an equation for each plane, wherein for two planes that intersect in the first image, an error between a calculated intersecting line and an actually observed intersecting line is minimized; and the 3D model generation unit further uses a computer vision algorithm to identify wall corners in the indoor image and connect the wall corners to generate a rough model of the room.

A third feature, combinable with any of the other features, specifies that the 3D model assembling unit corrects 3D models of the multiple rooms, including correcting wall line directions of all rooms by using a statistical method, so that wall lines of all rooms are aligned in the same direction if they were parallel within a specific error range; and when assembling the 3D models of the rooms, the 3D model assembling unit corrects one or more overlapping parts and/or gaps.

A fourth feature, combinable with any of the other features, specifies that the automatic 3D modeling apparatus further comprises: a 2D floorplan generation unit, configured to generate a 2D floorplan in the following ways: projecting each surface of the generated 3D model onto a plane parallel to the floor, and merging these projections into a polygon; correcting and simplifying the obtained polygon, including at least one of the following: (1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions; assembling the generated 2D floorplans of the rooms in the same two-dimensional coordinate system based on the position and capture direction information, to generate an overall 2D floorplan from the individual 2D floorplans of the rooms; and identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

A fifth feature, combinable with any of the other features, specifies that the 2D floorplan generation unit corrects 2D floorplans of the multiple rooms, including correcting wall line directions of all the rooms by using a statistical method, so that wall lines of all the rooms are aligned in the same direction if they were parallel within a specific error range; and when assembling the 2D floorplans of the rooms, the 2D floorplan generation unit corrects one or more of overlapping parts and gaps.

A sixth feature, combinable with any of the other features, specifies that the automatic 3D modeling apparatus further comprises a 2D floorplan generation unit, configured to generate a 2D floorplan in the following ways: projecting each surface of the overall 3D model generated by the 3D model assembling unit onto a plane parallel to the floor, and merging these projections into one or more polygons; correcting and simplifying the obtained polygon(s), including at least one of the following: (1) retaining only main vertices of the polygon and deleting small concave or convex rectangles; and (2) using a computer vision algorithm to detect straight lines in the picture, and then determining the direction of a wall, and aligning edges that are approximately parallel or perpendicular to the direction of the wall to corresponding directions; and identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

In another embodiment, a photography-based 3D modeling method comprises the following steps: attaching a mobile device with a photo capture function and a camera to a same camera stand; capturing a plurality of first images at a plurality of photo capture points using one or more of the mobile device and the camera; obtaining multiple second images using the camera or the mobile device during movement of the stand among the plurality of photo capture points; obtaining a position and a capture direction of each photo capture point by optionally using one or more sensors of one or more of the camera and the mobile device; building a tracking map that uses a global coordinate system based on the position of each photo capture point; generating 3D models on the mobile device or a remote server based on one or more first images captured at each photo capture point; placing the individual 3D models of all photo capture points in the global three-dimensional coordinate system based on the position and the capture direction of each photo capture point; and connecting the individual 3D models of multiple photo capture points to generate an overall 3D model that includes multiple photo capture points.

The foregoing and other described embodiments can each, optionally, include one or more of the following features:

In a seventh feature, combinable with any of the other features, specifies that the steps use a positioning system of the mobile device or the camera and performs feature point matching based on second images captured by the mobile device or the camera at adjacent photo capture points, to identify relative displacement and capture direction information of the photo capture points, in order to build a tracking map that includes all photo capture points in the global coordinate system and provide a position and a direction of each photo capture point.

In an eighth feature, combinable with any of the other features, specifies that the method further comprises correcting the tracking map from obtaining information that includes acceleration, velocity, and direction of movement by using one or more sensors of the mobile device or the camera.

In a ninth feature, combinable with any of the other features, specifies that the method further comprises obtaining an angle between a capture direction of a lens of the camera and a capture direction of the mobile device, wherein at an initialization stage, the positioning system based on the mobile device and the positioning system based on the camera run simultaneously, and the stand is moved by a specific distance; in such case, the two systems each provide one displacement vector, and an angle between the two vectors is the angle between the capture direction of the lens of the camera and the capture direction of the mobile device; an angle consistent with the capture direction of the mobile device is specified by manually rotating a preview image or a captured image of the camera; preview images or captured images of the mobile device and the camera are matched by using an image recognition algorithm, to identify the angle; or an additional mark is used including adding a mark to the stand to form a fixed angle with a mounting direction of the mobile device, and then the mark is identified in the preview image or the image of the camera, so as to calculate the angle between the capture direction of the lens of the camera and the capture direction of the mobile device.

In a tenth feature, combinable with any of the other features, specifies that the generating the 3D models includes: identifying one or more image areas of at least one of a floor, a ceiling, and a wall in the image based on a deep learning method; and dividing the identified one or more image areas into blocks based on an image processing technology, wherein each block is approximately considered as one plane, image blocks of the floor and the ceiling are located on a horizontal plane, and an image block of the wall is located on a vertical plane; and generating the 3D model by solving an equation for each plane, wherein for two planes that intersect in the image, an intersecting line of the two planes is used as a constraint, so that an error between a calculated intersecting line and an actually observed intersecting line is minimized.

In an eleventh feature, combinable with any of the other features, specifies that the generating the 3D models further includes: using a computer vision algorithm to identify wall corners in an indoor image, and connecting the wall corners to generate a rough model of a room.

In a twelfth feature, combinable with any of the other features, specifies that the method further comprises: converting local coordinates of a 3D model of a single photo capture point into global coordinates based on a position and a capture direction of each photo capture point, so as to obtain an overall 3D model of all photo capture points;

performing a correction on the individual 3D models of multiple photo capture points, including correcting wall line directions of all photo capture points by using a statistical method, so that wall lines of all rooms are aligned in the same direction if they were parallel within a specific error range; and when assembling the 3D models of the photo capture points, correcting one or more overlapping parts and gaps.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system, comprising:
   a first photo capture unit, configured to capture a first image of each of multiple spaces;
   a second photo capture unit configured to capture a second image of each of the multiple spaces, wherein the second photo capture unit is arranged such that an angle between a capture direction of a lens of the first photo capture unit and a capture direction of a lens of the second photo capture unit is fixed:
   a three-dimensional (3D) model generation unit, configured to generate a three-dimensional (3D) model of each space based on the first image that is captured by the first photo capture unit for each of the multiple spaces;
   a capture position acquisition unit, configured to obtain position and capture direction information of the first photo capture unit in capturing the first image; and
   a three-dimensional (3D) model assembling unit, configured to, based on the position and capture direction information, combine the 3D models of the multiple spaces in a global three-dimensional coordinate system to generate an overall 3D model that includes the multiple spaces,
   wherein the second photo capture unit is farther configured to capture multiple second images during a process that the second photo capture unit moves among the multiple spaces; and
   wherein the capture position acquisition unit is further configured to perform feature point matching based on the multiple second images to obtain relative displacement and capture direction information of each photo capture points in capturing the multiple second images.

2. The system according to claim 1, wherein
   the first photo capture unit has one or more of positioning-aware sensors and direction-aware sensors; and
   the capture position acquisition unit obtains, based on one or more of positioning information or direction information provided by the first photo capture unit in capturing a first image of a space in which the first photo capture unit is located, one or more of position or capture direction information of the first photo capture unit in capturing the first image of the space in which the first photo capture unit is located.

3. The system according to claim 1, wherein:
   the first photo capture unit has one or more of a positioning sensor or a direction sensor configured to obtain one or more of positioning information or direction information in capturing a first image of a space in which the first photo capture unit is located; and
   the capture position acquisition unit corrects one or more of the relative displacement and the capture direction information based on the positioning information or the direction information provided by the first photo capture unit in capturing the first image of the space in which the first photo capture unit is located.

4. The system according to claim 3, wherein the first photo capture unit includes a displacement sensor and the capture position acquisition unit corrects the relative displacement and/or capture direction information based on displacement information that is obtained by the displacement sensor.

5. The system according to claim 1, wherein the 3D model assembling unit converts local coordinates of a 3D model of a single space into global coordinates based on the position and capture direction information obtained by the capture position acquisition unit.

6. The system according to claim 5, wherein the converting the local coordinates of the 3D model of the single space into the global coordinates comprises:
   enabling the first photo capture unit to move a predetermined distance;
   obtaining, by the capture position acquisition unit, positions of two endpoints of the predetermined distance; and
   obtaining a ratio of the local coordinates to the world coordinates based on a ratio of a distance between the positions of the two endpoints to the predetermined distance.

7. The system according to claim 5, wherein the converting the local coordinates of the 3D model of the single space into the global coordinates comprises:
   identifying, by the capture position acquisition unit, one or more feature points on the first image;
   estimating, based on the identified feature point, a vertical distance between a plane on which a floor surface or a ceiling surface of the space is located and the first photo capture unit; and
   calculating a ratio of the vertical distance to a height of the first photo capture unit to obtain the scale of the local coordinates to the global coordinates.

8. The system according to claim 7, wherein
   before performing photo capture at a first photo capture point or during movement of the first photo capture unit subsequent to the first capture point, the first photo capture unit moves a predetermined distance to obtain a predetermined quantity of the feature points.

9. The system according to claim 1, wherein
   the first photo capture unit has binocular lenses, and the binocular lenses separately capture first images at a same photo capture point; and
   the 3D model generation unit compares the first images that are captured by the binocular lenses, determines corresponding pixels between the first images captured by the binocular lenses, and obtains depth information of each corresponding pixel.

10. The system according to claim 1, wherein
    the 3D model generation unit predicts the depth of each pixel in the first image by using a deep learning method, and calculates a normal direction of each pixel or predicts the normal direction of each pixel by using the deep learning method.

11. The system according to claim 1, wherein
the first photo capture unit is implemented by one or more of a camera and a mobile device with a photo capture function;
the 3D model generation unit is implemented by one or more of the mobile device or by a remote server;
the capture position acquisition unit is implemented by the camera or the mobile device; and
the 3D model assembling unit is implemented by one or more of the mobile device and a remote server.

12. The system according to claim 11, wherein
the camera and the mobile device with a photo capture function for implementing the first photo capture unit and the second photo capture unit are attached to a same camera stand;
during movement of the stand, multiple second images are captured by the camera or the mobile device; and
one or more of the position and capture direction information of the camera or the mobile device in capturing the first image of a space in which the camera or the mobile device is located is determined at least in part based on the multiple second images.

13. The system according to claim 12, wherein
based on a positioning system of the camera or the mobile device, feature point matching is performed on second images at adjacent photo capture points to obtain one or more of relative displacement or capture direction information of each photo capture point, thereby providing one or more of a relative position or a direction of each photo capture point.

14. The system according to claim 12, wherein the first photo capture unit obtains an angle between a capture direction of a lens of the camera and a capture direction of the mobile device by using one or more of the following methods:
　simultaneously running a positioning system based on the mobile device and a positioning system based on the camera, moving the stand by a specific distance to obtain two displacement vectors by the position systems, and determining an angle between the two displacement vectors as the angle between the capture direction of the lens of the camera and the capture direction of the mobile device;
　specifying an angle consistent with the capture direction of the mobile device by manually rotating a preview image or a captured image of the camera;
　matching preview images or captured images of the mobile device and the camera by using an image recognition algorithm, to identify the angle;
　using an additional mark on the stand to form a fixed angle with a mounting direction of the mobile device, and then identifying the mark in a preview image or an image of the camera, so as to calculate the angle between the capture direction of the lens of the camera and the capture direction of the mobile device; and
　using a camera installation interface on the stand so that a known fixed angle is formed between the camera and the mobile device.

15. The system according to claim 1, wherein
the space is a room;
the first image is an indoor image of the room; and
the 3D model generation unit identifies one or more image areas of at least one of a floor, a ceiling, and a wall of the room in the first image based on a deep learning method; divides the identified image areas into blocks based on an image processing technology, wherein each block is approximately considered as one plane, image blocks of the floor and the ceiling are located on a horizontal plane, and an image block of the wall is located on a vertical plane; and generates the 3D model by solving an equation for each plane, wherein for two planes that intersect in the first image, an error between a calculated intersecting line and an actually observed intersecting line is minimized.

16. The system according to claim 1, wherein the 3D model generation unit further uses a computer vision algorithm to identify wall corners in the indoor image and connect the wall corners to generate a rough model of the room.

17. The system according to claim 16, wherein
the 3D model assembling unit corrects 3D models of the multiple rooms, including correcting wall line directions of all rooms by using a statistical method, so that wall lines of all rooms are substantially aligned in the same direction if they were parallel within a specific error range; and
in assembling the 3D models of the rooms, the 3D model assembling unit corrects one or more of an overlapping part or a gap.

18. The system according to claim 16, further comprising:
a 2D floorplan generation unit, configured to generate a 2D floorplan including:
　projecting each surface of the generated 3D model onto a plane parallel to the floor, and merging these projections into a polygon;
　correcting and simplifying the obtained polygon, including at least one of the following:
　　identifying only main vertices of the polygon and deleting small concave or convex rectangles; and
　　using a computer vision algorithm to detect straight lines in the picture, and then determining the direction of a wall, and aligning edges that are approximately parallel or perpendicular to the direction of the wall to corresponding directions;
　assembling the generated 2D floorplans of the rooms in the same two-dimensional coordinate system based on the position and capture direction information of each space obtained by the capture position acquisition unit, to generate an overall 2D floorplan from the individual 2D floorplans of the rooms; and
　identifying and marking a position of at least one of a door and a window, including identifying the position of the at least one of the door and the window on the indoor image by using a deep learning method, or determining the position of the door by finding where a room outline is crossed by the track of the tracking map from capturing the first images of multiple rooms of a same property.

19. The system according to claim 18, wherein
the 2D floorplan generation unit corrects 2D floorplans of the multiple rooms, including correcting wall line directions of all the rooms by using a statistical method, so that wall lines of all the rooms are aligned in a same direction if they were parallel within a specific error range; and
in assembling the 2D floorplans of the rooms, the 2D floorplan generation unit corrects one or more overlapping parts or gaps.

20. The system according to claim 16, further comprising:
a 2D floorplan generation unit, configured to generate a 2D floorplan in the following ways:
　projecting each surface of the overall 3D model generated by the 3D model assembling unit onto a plane parallel to the floor, and merging these projections into one or more polygons; and correcting and simplifying the obtained one or more polygon, including at least one of the following:
retaining only main vertices of the polygon and deleting small concave or convex rectangles; and
using a computer vision algorithm to detect straight lines in the picture, and then determining the direction of a wall, and aligning edges that are approximately parallel or perpendicular to the direction of the wall to corresponding directions; and identifying and marking a position of one or more of a door or a window, including identifying the position of the one or more of the door or the window on the indoor image by using a deep learning method, or determining the position of the door by finding where a room outline is crossed by the track of the tracking map from capturing the first images of multiple rooms of the same property.

21. The system of claim 1, wherein the first photo capture device is a camera and the second photo capture device is a mobile phone.

22. The system of claim 1, further comprising a mark configured to be identified in a preview or a second image of the second photo capture unit, and configured to be used to calculate the angle between the capture direction of the lens of the first photo capture unit and the capture direction of the lens of the second photo capture unit.

23. An automatic three-dimensional (3D) modeling method, comprising:
a 3D model generation act that generates a 3D model of each space of multiple spaces based on a first image of each space of the multiple spaces included in a modeling object; and
a 3D model assembling act that assembles, based on position and capture direction information of the first image of each of the multiple spaces being captured, the 3D models of the multiple spaces generated in the 3D model generation act in a global three-dimensional coordinate system, to generate an overall 3D model from the 3D models of the spaces,
wherein the 3D model assembling act includes correcting a wall line direction in a 3D model of a space of the multiple spaces to achieve wall lines in the 3D models of the multiple spaces are parallel to one another within a threshold error range.

24. The automatic 3D modeling method according to claim 23, wherein
in the 3D model assembling, local coordinates of the 3D model of a single space are converted into global coordinates based on the position and capture direction information, so as to obtain an overall 3D model of all the spaces.

25. The automatic 3D modeling method according to claim 23, wherein
the space is a room;
the first image is an indoor image of the room;
the 3D model generation includes:
one or more image areas of at least one of a floor, a ceiling, and a wall in the first image are identified based on a deep learning method;
the identified image area is divided into blocks based on an image processing technology, wherein each block is approximately considered as one plane, image blocks of the floor and the ceiling are located on a horizontal plane, and an image block of the wall is located on a vertical plane; and
the 3D model is generated by solving an equation for each plane, wherein for two planes that intersect in the first image, an error between a calculated intersecting line and an actually observed intersecting line is minimized.

26. The automatic 3D modeling method according to claim 25, further comprising:
generating a 2D floorplan in the following ways:
projecting each surface of the generated 3D model onto a plane parallel to the floor, and merging these projections into a polygon;
correcting and simplifying the obtained polygon, including at least one of the following methods:
retaining only main vertices of the polygon and deleting small concave or convex rectangles; and
using a computer vision algorithm to detect straight lines in the picture, and then determining the direction of a wall, and aligning edges that are approximately parallel or perpendicular to the direction of the wall to corresponding directions;
assembling the generated 2D floorplans of the rooms in a same two-dimensional coordinate system based on the position and capture direction information, to generate an overall 2D floorplan from the individual 2D floorplans of the rooms; and
identifying and marking a position of a door and/or a window, including identifying the position of the door and/or the window on the indoor image by using a deep learning method, or determining the position of the door by finding where a room outline is crossed by the track of the tracking map from capturing the first images of multiple rooms of the same property.

27. The automatic 3D modeling method according to claim 26, wherein
in the 2D floorplan generation,
2D floorplans of the multiple rooms are corrected, including correcting wall line directions of all the rooms by using a statistical method, so that wall lines of all the rooms are substantially aligned in the same direction if they were parallel within a specific error range; and
the assembling the 2D floorplans of the rooms includes correcting one or more of an overlapping part and a gap between 2D floorplan of two rooms.

28. The automatic 3D modeling method according to claim 25, further comprising:
generating a 2D floorplan including:
projecting each surface of the overall 3D model generated in the 3D model assembling step onto a plane parallel to the floor, and merging these projections into one or more polygons;
correcting and simplifying the obtained a polygon using at least one of the following:
retaining only main vertices of the polygon and deleting small concave or convex rectangles; and
using a computer vision algorithm to detect straight lines in the picture, and then determining the direction of a wall, and aligning edges that are approximately parallel or perpendicular to the direction of the wall to corresponding directions; and
identifying and marking a position of one or more of a door and a window, including identifying the position of one or more of the door and the window on the indoor image by using a deep learning method, or determining the position of the door by finding where a room outline is crossed by the track of the tracking map from capturing the first images of multiple rooms of the same property.

29. The automatic 3D modeling method according to claim 23, wherein the space is a room;

the first image is an indoor image of the room; and the 3D model generation includes using a computer vision algorithm to identify wall corners in the indoor image and the wall corners are connected to generate a rough model of the room.

30. A photography-based three-dimensional (3D) modeling method, comprising the following steps:

attaching a mobile device with a photo capture function and a camera to a same camera stand, wherein the attaching includes arranging a lens of the mobile device and a lens of the camera with an angle between one another;

capturing a plurality of first images at a plurality of photo capture points using one or more of the mobile device and the camera;

obtaining multiple second images using the camera or the mobile device during movement of the stand among the plurality of photo capture points;

obtaining a position and a capture direction of each photo capture point by optionally using one or more sensors of one or more of the camera and the mobile device;

building a tracking map that uses a global coordinate system based on the position of each photo capture point;

generating 3D models on the mobile device or a remote server based on one or more first images captured at each photo capture point; and placing the individual 3D models of all photo capture points in the global three-dimensional coordinate system based on the position and the capture direction of each photo capture point; and connecting the individual 3D models of multiple photo capture points to generate an overall 3D model that includes multiple photo capture points, wherein the connecting includes correcting a wall line direction of a 3D model of a photo capture point of the multiple photo capture points to make wall lines in the 3D models of the multiple photo capture points parallel to one another within a threshold error range.

* * * * *